(12) United States Patent
Chuang et al.

(10) Patent No.: US 11,711,613 B2
(45) Date of Patent: Jul. 25, 2023

(54) IMAGE ALIGNMENT FOR COMPUTATIONAL PHOTOGRAPHY

(71) Applicant: QUALCOMM Incorporated, San Diego, CA (US)

(72) Inventors: Shang-Chih Chuang, San Diego, CA (US); Ron Gaizman, Hof HaCarmel (IL); Pradeep Veeramalla, Hyderabad (IN); Shizhong Liu, San Diego, CA (US); Weiliang Liu, San Diego, CA (US); Xiaoyun Jiang, San Diego, CA (US); Narayana Karthik Ravirala, San Diego, CA (US); Jiafu Luo, Irvine, CA (US); Srinath Anekere Narayan, San Diego, CA (US); Wei Zou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 17/241,742

(22) Filed: Apr. 27, 2021

(65) Prior Publication Data
US 2022/0345605 A1   Oct. 27, 2022

(51) Int. Cl.
H04N 23/68   (2023.01)
(52) U.S. Cl.
CPC ....... *H04N 23/689* (2023.01); *H04N 23/6812* (2023.01)
(58) Field of Classification Search
CPC ............ G06T 5/50; G06T 2207/20221; G06T 2207/20208; G06T 2207/10016; G06T 5/009; H04N 5/2355; H04N 5/2356; H04N 5/2329; H04N 5/23258; H04N 23/689; H04N 23/6812; H04N 23/45;
(Continued)

(56) References Cited

U.S. PATENT DOCUMENTS 10,867,389 B2 * 12/2020 Takahashi ................. G06T 7/97
2012/0002890 A1 *  1/2012 Mathew ............. H04N 5/23267
                                                382/232
(Continued)

FOREIGN PATENT DOCUMENTS

WO   WO-2019040387 A1   2/2019

OTHER PUBLICATIONS

International Search Report and Written Opinion—PCT/US2022/070792—ISA/EPO—dated Jun. 3, 2022 (2101777WO).

*Primary Examiner* — Chiawei Chen
(74) *Attorney, Agent, or Firm* — Qualcomm Incorporated

(57) ABSTRACT

Image frames for computational photography may be corrected, such as through rolling shutter correction (RSC), prior to fusion of the image frames to reduce wobble and jitter artifacts present in a video sequence of HDR-enhanced image frames. First and second motion data regarding motion of the image capture device may be determined for times corresponding to the capturing of the first and second image frames, respectively. The rolling shutter correction (RSC) may be applied to the first and second image frames based on both the first and second motion data. The corrected first and second image frames may then be aligned and fused to obtain a single output image frame with higher dynamic range than either of the first or second image frames.

24 Claims, 11 Drawing Sheets

(58) Field of Classification Search
CPC .... H04N 23/683; H04N 23/73; H04N 23/741; H04N 23/81; H04N 25/531
See application file for complete search history.

(56) References Cited

U.S. PATENT DOCUMENTS

| | | | | |
|---|---|---|---|---|
| 2012/0281921 | A1* | 11/2012 | Dowell | G06V 10/7515 382/195 |
| 2012/0281922 | A1* | 11/2012 | Yamada | H04N 5/23254 382/201 |
| 2012/0306999 | A1* | 12/2012 | Zhou | H04N 5/2624 348/E5.031 |
| 2013/0329072 | A1* | 12/2013 | Zhou | G06T 3/4038 348/222.1 |
| 2015/0123990 | A1* | 5/2015 | Satoh | H04N 23/689 345/625 |
| 2017/0026581 | A1* | 1/2017 | Ryu | G06V 10/469 |
| 2018/0035068 | A1* | 2/2018 | Morimoto | H04N 5/37457 |
| 2018/0302544 | A1* | 10/2018 | Dhiman | H04N 5/23238 |
| 2019/0037112 | A1* | 1/2019 | Fink | H04N 23/6812 |
| 2019/0058811 | A1* | 2/2019 | Douady-Pleven | H04N 5/23238 |
| 2020/0211166 | A1* | 7/2020 | Yao | H04N 5/23232 |
| 2020/0404178 | A1* | 12/2020 | Li | H04N 5/23254 |
| 2021/0337101 | A1* | 10/2021 | Yuan | H04N 23/6811 |
| 2022/0076390 | A1* | 3/2022 | Uesugi | G06T 5/50 |

* cited by examiner

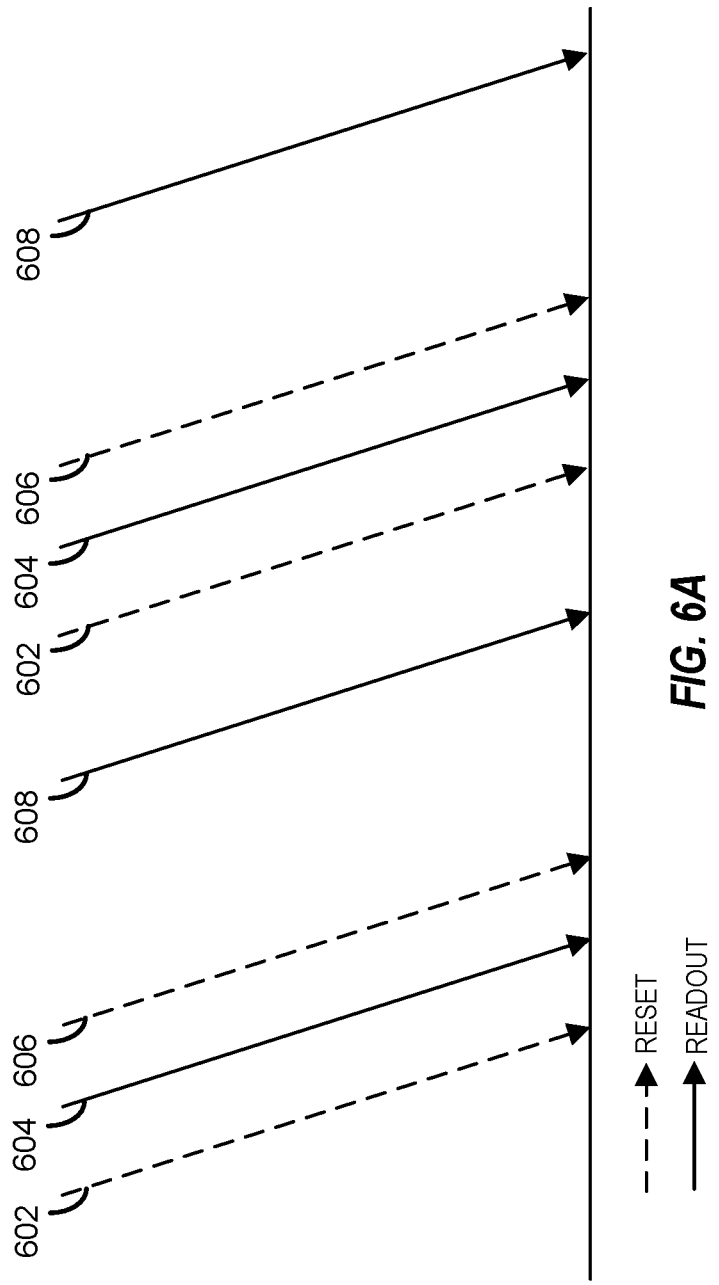

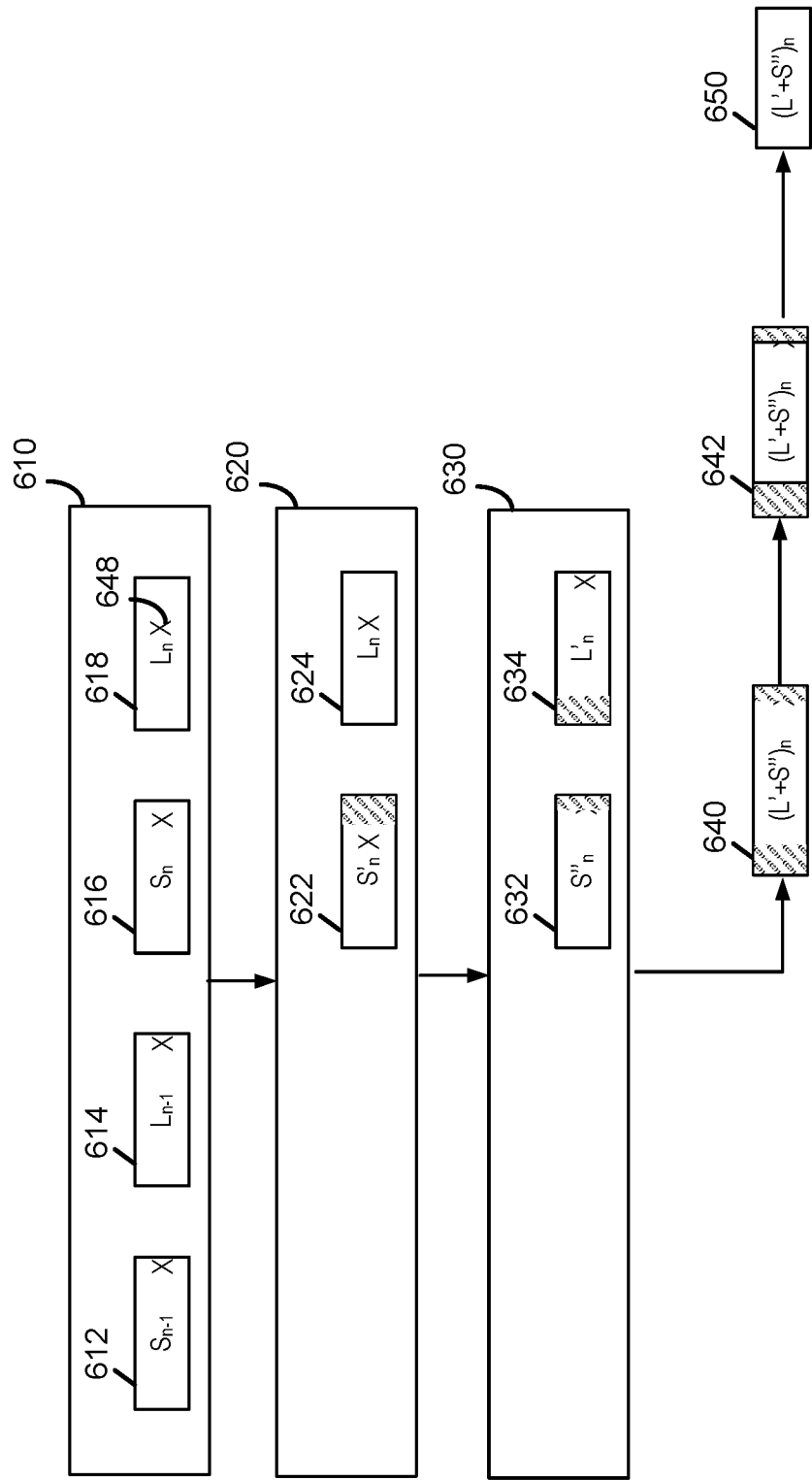

IMAGE ALIGNMENT FOR COMPUTATIONAL PHOTOGRAPHY

FIELD OF THE DISCLOSURE

Aspects of the present disclosure relate generally to image processing. Some features of the disclosure may enable and provide improvements in the processing of images in computational photography.

BACKGROUND

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

The human eye has greater dynamic range than some electronic image capture devices. That is, the human eye can view a larger range of darkness (e.g., black) to brightness (e.g., white) than these devices. In scenes with high contrast (e.g., large difference between bright and dark regions), these devices may produce still image photos or videos with noticeable defects due to the limited dynamic range of the device. For example, details in dark portions of the scene, such as a person's face covered by a shadow, may be lost and appear as black pixels without facial details while details in bright portions of the scene, such as a person standing in sunlight, may be washed out and appear as missing or white pixels.

Modes of image capture using such devices may include high dynamic range (HDR) functionality to compensate for the limited dynamic range of the device. In HDR image capture mode, multiple representations of a scene are captured with different exposure lengths and the different representations combined. The combining may include selecting data from a short exposure capture in highlight areas and selecting data from a long exposure capture in darker regions. The combination of multiple exposure length captures improves the resulting dynamic range of the image captured by the image capture device. With higher dynamic range, the device may be able to obtain still image photos or videos with details in low light portions of the scene and details in high light portions of the scene.

During the capture of the multiple representations of the scene, objects may move, such as when a person moves from side-to-side or a bird flies overhead, or the device may move, such as when a user shakes the device. Each of the representations captured at different times may have objects in the scene located at different locations within the representations. Combining the image frames of different representations at different exposure lengths may create artifacts from the mismatch of the locations of the objects between the different representations. One such artifact is a wobbling appearance of the object in a video generated using high dynamic range (HDR) functionality.

BRIEF SUMMARY OF SOME EXAMPLES

A source of the problem is that image frames captured for different exposure times are separated in time and may have a rolling shutter with different skews. Corrections may be applied to the image frames prior to the fusing of the different representations to correct for global alignment and rolling shutter. Such corrections may reduce artifacts, such as wobbling, in the output of photography employing high dynamic range (HDR) functionality, in both still images and videos. In one aspect, electronic image stabilization (EIS) may apply a rolling shutter correction (RSC) to image frames prior to fusion of the image frames in computational photography such as high dynamic range (HDR) processing and multi-frame noise reduction (MFNR) processing. Computational photography involving multiple image frames may include processing of a first image frame and a second image frame captured at first and second exposure times, respectively. First and second motion data regarding motion of the image capture device may be determined for times corresponding to the capturing of the first and second image frames, respectively. A correction, such as a rolling shutter correction (RSC), may be applied to the first and second image frames using both the first and second motion data. The corrected (e.g., reduced distortion or undistorted) first and second image frames may then be aligned and fused to obtain a single output image frame. The output image frame may have an improved appearance resulting from the fusion of multiple image frames, such as an output image frame with higher dynamic range than either of the first or second image frames alone (as in HDR processing) and/or with lower noise than either of the first or second image frames alone (as in MFNR processing). In some aspects, EIS may be applied to either the first or second image frame. In some aspects, the HDR photography may include capturing three or more representations of the scene in three or more image frames captured at different exposure times, and aspects described herein applied to the processing of more than two image frames. For example, the RSC correction may be applied to a third image frame based on first, second, and third motion data to form a third corrected image frame, and the first, second, and third corrected image frames (each corrected based on motion data corresponding to the capture of all image frames used in the HDR processing) combined in a fusion process for generating an HDR-enhanced image frame.

In some aspects, image frames with shorter exposure times are captured earlier in the sequence of image frame captures than image frames with longer exposure times. Those two or more image frames captured in order from shorter exposure times to longer exposure times may be processed through the correction using motion data and subsequent fusion of corrected image frames to obtain an output for HDR photography. The capturing of shorter exposure frames earlier may be useful when a panning motion is occurring during the image capture. During panning, such as from left to right, delay in short readout and panning movement results in the short-exposure image frame reflecting a different scene as compared to the long-exposure image frame. When such image frames are fused, the mismatch results in a margin issue because the longer and shorter-exposure image frames do not overlap in a margin of the sensor. Capturing the shorter-exposure image frame first to speed up the process and reduce overlap mismatch after EIS margin cropping may further improve the appearance of HDR-enhanced image frames by further reducing wobbling and other artifacts.

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In general, this disclosure describes image processing techniques involving digital cameras having image sensors and image signal processors (ISPs). The image signal processor may be configured to control the capture of image frames from one or more image sensors and process the image frames from one or more image sensors to generate a view of a scene in a corrected image frame and/or a HDR-enhanced image frame. In an example, the image signal processor may receive an instruction to capture a sequence of image frames in response to the loading of software, such as a camera application, on the CPU. The image signal processor may be configured to produce a single flow of output frames, based on respective corrected images from the image sensors. The single flow of output frames may include image frames that contain image data from an image sensor that have been corrected, such as by rolling shutter correction, to match the image frame to other image frames in the output flow (e.g., previous frames captured by a same or different image sensor). Capturing image frames with different exposure times from one or more image sensors for fusion in an HDR processing mode according to aspects of this disclosure may result in reduced artifacts. A switching of image sensors during the capture of image frames in an HDR processing mode may also generate the appearance of an artifact, which likewise can be reduced by an image signal processor or other processor employing techniques of this disclosure.

After an output frame representing the scene is generated by the image signal processor, the view of the scene may be displayed on a device display, saved to a storage device as a picture or a sequence of pictures as a video, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, etc.). In other examples, the image signal processor may output frames of the image data to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, etc. That is, the image signal processor may obtain incoming frames from one or more image sensors, each coupled to one or more camera lenses, and, in turn, may produce and output a flow of output frames to various output destinations. In such examples, the image signal processor may be configured to produce a flow of output frames that may have reduced artifacts due to motion of the image capture device.

In one aspect of the disclosure, a method for image processing, such as in a HDR or MFNR photography mode of a camera application or in post-processing of previously-captured image frames using computational photography, includes receiving a first image frame and a second image frame; determining a corrected first image frame based on the first image frame, first motion data corresponding to the first image frame, and second motion data corresponding to the second image frame; determining a corrected second image frame based on the second image frame, the first motion data, and the second motion data; determining an alignment correction to align the corrected first image frame to the corrected second image frame; and/or determining a fused image frame based on the first image frame, the second image frame, and the alignment correction. In some aspects, the method may be performed for HDR photography in which the first image frame and the second image frame are captured using different exposure times, different apertures, different lenses, or other different characteristics that may result in improved dynamic range of a fused image when the two image frames are combined. In some aspects, the method may be performed for MFNR photography in which the first image frame and the second image frame are captured using the same or different exposure times. In certain aspects, a method for computational processing may include receiving a first image frame captured at a first exposure time and a second image frame captured at a second exposure time different from the first exposure time; determining a corrected first image frame based on the first image frame, first motion data corresponding to motion of a first image sensor capturing the first image frame, and second motion data corresponding to motion of a second image sensor capturing the second image frame; determining a corrected second image frame based on the second image frame, the first motion data, and the second motion data; determining an alignment correction to align the corrected first image frame to the corrected second image frame; and/or determining a fused image frame based on the first image frame, the second image frame, and the alignment correction. The corrected first and second image frame prior to the aligning and fusing may be corrected to reduce distortion in the image frames, such as by reducing motion blur, reducing rolling shutter distortion, and/or otherwise reduce distortion. The first and second image sensors may be the same or different image sensors. In some aspects in which the first and second image sensors are different, the image sensors may be part of a lens cluster on a mobile device.

In an additional aspect of the disclosure, an apparatus is disclosed that includes at least one processor, and a memory coupled to the at least one processor. The at least one processor is configured to perform any of the methods or techniques described herein. For example, the at least one processor may be configured to perform steps including receiving a first image frame captured (such as using a first exposure time) and a second image frame (such as using a second exposure time that is different from or the same as the first exposure time); determining a corrected first image frame based on the first image frame, first motion data corresponding to the first image frame, and second motion data corresponding to the second image frame; determining a corrected second image frame based on the second image frame, the first motion data, and the second motion data; determining an alignment correction to align the corrected first image frame to the corrected second image frame; and/or determining a fused image frame based on the first image frame, the second image frame, and the alignment correction. In some aspects, the apparatus is configured to perform steps including receiving a first image frame captured at a first exposure time and a second image frame captured at a second exposure time different from the first exposure time; determining a corrected first image frame based on the first image frame, first motion data corresponding to motion of a first image sensor capturing the first image frame, and second motion data corresponding to motion of a second image sensor capturing the second image frame;

determining a corrected second image frame based on the second image frame, the first motion data, and the second motion data; determining an alignment correction to align the corrected first image frame to the corrected second image frame; and/or determining a fused image frame based on the first image frame, the second image frame, and the alignment correction.

The at least one processor may include an image signal processor or a processor including specific functionality for camera controls and/or processing, such a determining a duration of the first exposure time and/or second exposure time for the first image frame and/or second image frame. The at least one processor may also or alternatively include an application processor. The methods and techniques described herein may be entirely performed by the image signal processor or the application processor, or various operations may be split between the image signal processor and the application processor, and in some aspects split across additional processors.

The apparatus may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

In an additional aspect of the disclosure, a non-transitory computer-readable medium stores instructions that, when executed by a processor, cause the processor to perform operations including those described in the method and techniques described herein. For example, the operations may include receiving a first image frame captured (such as using a first exposure time) and a second image frame (such as using a second exposure time that may be the same as or different from the first exposure time); determining a corrected first image frame based on the first image frame, first motion data corresponding to the first image frame, and second motion data corresponding to the second image frame; determining a corrected second image frame based on the second image frame, the first motion data, and the second motion data; determining an alignment correction to align the corrected first image frame to the corrected second image frame; and/or determining a fused image frame based on the first image frame, the second image frame, and the alignment correction. In some aspects, the operations may include receiving a first image frame captured at a first exposure time and a second image frame captured at a second exposure time different from the first exposure time; determining a corrected first image frame based on the first image frame, first motion data corresponding to motion of a first image sensor capturing the first image frame, and second motion data corresponding to motion of a second image sensor capturing the second image frame; determining a corrected second image frame based on the second image frame, the first motion data, and the second motion data; determining an alignment correction to align the corrected first image frame to the corrected second image frame; and/or determining a fused image frame based on the first image frame, the second image frame, and the alignment correction. The first and second image sensors may be the same or different image sensors.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data over a first network connection of a plurality of network connections; and a processor coupled to the first network adaptor, and the memory.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6A is a timing diagram illustrating capturing image frames for computational processing according to some aspects of the disclosure.

FIG. 6B is a block diagram illustrating computational processing of two image capture frames with a shorter-exposure image frame captured before a longer-exposure image frame according to some aspects of the disclosure.

Like reference numbers and designations in the various drawings indicate like elements.

DETAILED DESCRIPTION

Figure 1:
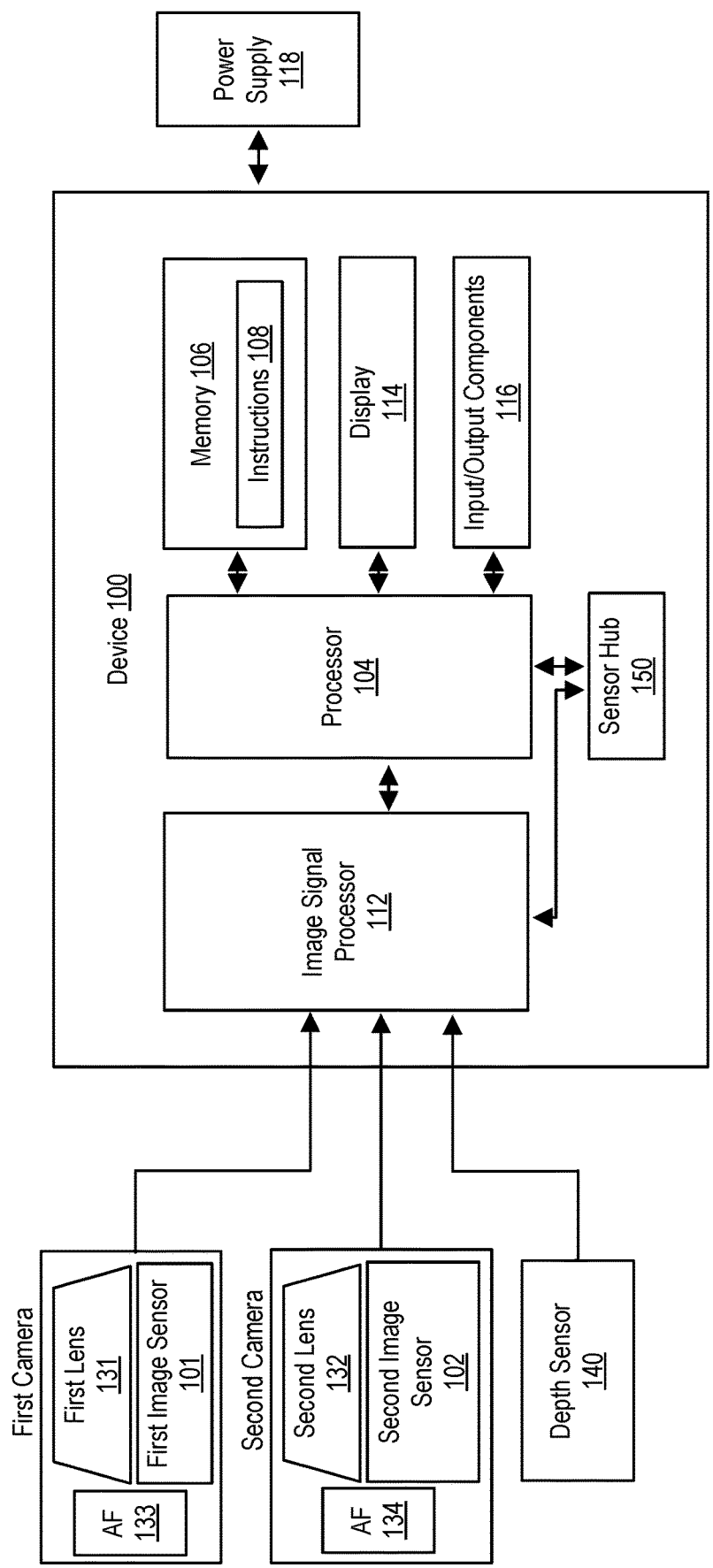
FIG. 1 is a block diagram of a computing device configured to perform one or more of the example techniques described in this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support image processing of captured image frames for photography and video. Particular implementations of the subject matter described in this disclosure may be implemented to realize potential advantages or benefits, such as improved image quality by reducing artifacts in sequences of image frames obtained in an HDR photography mode or other photography mode capturing multiple image frames in which objects may be misaligned between image frames. The systems, apparatus, methods, and computer-readable media may be embedded in image capture devices, such as mobile phones, tablet computing devices, laptop computing devices, other computing devices, or digital cameras.

An example device for capturing image frames using multiple image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs), or other suitable circuitry for processing images captured by the image sensors. The one or more image signal processors may provide processed image frames to a memory and/or a processor (such as an application processor, an image front end (IFE), an image processing engine (WE), or other suitable processing circuitry) for further processing, such as for encoding, storage, transmission, or other manipulation.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure. Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any suitable electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and a number of input/output (I/O) components 116, such as a touch screen interface and/or physical buttons. The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be included for a wireless communication device. In another example, one or more other sensors (such as a global positioning system (GPS) receiver) may be included in or coupled to the device. In a further example, an analog front end to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. Such non-camera sensors may be integrated in the device 100 and/or coupled to the device 100. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In some aspects, a gyroscope in an electronic image stabilization system (EIS) may be coupled to the sensor hub or coupled directly to the image signal processor 112.

The image signal processor 112 may receive image data, such as used to form image frames, from a local bus connection to image sensors 101, 102 or by other connections, such as a wire interface to an external image sensor or wireless interface to a distant image sensor. In some embodiments, the device 100 may include a first camera comprising the first image sensor 101 and corresponding first lens 131 and a second camera comprising the second image sensor 102 and corresponding second lens 132. Each of the lenses 131 and 132 may have associated autofocus (AF) systems 133 and 134, respectively, that adjusts the lenses 131 and 132 to focus on a particular focal plane at a certain scene depth from the sensors 101 and 102. The AF systems 133 and 134 may be assisted by depth sensor 140 and/or provide depth information to other components of the device 100, such as the ISP 112, through metadata associated with the image frames captured by the sensors 101 and 102. In some aspects, the device 100 may include an interface to receive image data from the image sensors 101 and 102 located apart from the device 100. The device 100 may perform image processing on the image data from a combination of image sensors located within the device 100 or separate from the device 100.

The first image sensor 101 and the second image sensor 102 are configured to capture one or more image frames. The image sensors 101 and 102 may also include or be coupled to one or more lenses 131 and 132, respectively, for focusing light, one or more apertures for receiving light, one or more shutters for blocking light when outside an exposure window, one or more color filter arrays (CFAs) for filtering light outside of specific frequency ranges, one or more analog front ends for converting analog measurements to digital information, or other suitable components for imaging. For example, the first image sensor 101 may be coupled to a first lens 131 and the second image sensor 102 may be coupled to a second lens 132. The first lens 131 and second lens 132 may have different field of views, such as when the first lens 131 is an ultra-wide (UW) lens and the second lens 132 is a wide (W) lens. The device 100 may also include or couple to, such as through sensor hub 150 and/or input/output components 116, a flash, a depth sensor, a GPS, or other suitable components for imaging or supporting imaging applications.

The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number of image sensors may be coupled to the image signal processor 112. In some aspects, depth sensors such as depth sensor 140 may be coupled to the image signal processor 112 and output from the depth sensors processed in a similar manner to that of image sensors 101 and 102. In addition, any number of additional image sensors or image signal processors may exist for the device 100. In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may execute software and/or may include specific hardware (such as one or more integrated circuits (ICs)) to perform one or more operations described in the present disclosure.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to the memory and configured to access the memory for writing output frames for display or long-term storage.

In some embodiments, at least one of the image signal processor 112 or the processor 104 executes instructions to perform various operations described herein. For example, execution of the instructions can instruct the image signal processor 112 to begin or end capturing an image frame or a sequence of image frames, in which the capture includes HDR-enhanced image frames generated from captured image frames as described herein. In some embodiments, the processor 104 may include one or more general-purpose processors capable of executing scripts or instructions of one or more software programs, such as instructions 108 stored within the memory 106. For example, the processor 104 may include one or more application processors configured to execute the camera application (or other suitable application for generating images or video) stored in the memory 106. In executing the camera application, the processor 104 may be configured to instruct the image signal processor 112 to perform one or more operations with reference to the image sensors 101 or 102. For example, the camera application may receive a capture command upon which a video comprising a sequence of image frames is captured and processed through one or more methods described herein for reducing artifacts by applying a rolling shutter correction to image frames prior to fusion to generate the HDR-enhanced image frame. The camera application may allow enabling and disabling a HDR photography mode, in which techniques disclosed herein may be applied when HDR photography is enabled. The camera application may also or alternatively include automatic determination of when to enable or disable the HDR photography, including the techniques disclosed herein, based on certain criteria, such as detecting a high dynamic range in a scene by detecting a number of pixels above a bright light intensity threshold exceeds a first threshold and/or detecting a number of pixels below a dark light intensity threshold exceeds a second threshold. Execution of instructions 108 outside of the camera application by the processor 104 may also cause the device 100 to perform any number of functions or operations. In some embodiments, the processor 104 may include ICs or other hardware in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, the processor 104, the memory 106, the image signal processor 112, the display 114, and the I/O components 116 may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure, such as described with reference to FIG. 9 and FIG. 10. As such, the present disclosure is not limited to a specific device or configuration of components, including the device 100.

A multi-sensor device such as the apparatus 100 may switch from one image sensor to another image sensor, such as between sensor 101 and 102, based on a user request or certain criteria being met. For example, a user may indicate a request to switch from a wide angle (W) lens corresponding to sensor 101 to a tele lens (T) corresponding to a sensor 102 by initiating a portrait mode in a camera application that is accessing the sensors 101 and 102. As another example, a user may change a zoom level in the camera application that causes the image signal processor 112 to switch from sensor 101 to sensor 102 based on characteristics of the lenses corresponding to the sensors 101 and 102. As a further example, changing scene characteristics, such as light levels, may cause the image signal processor 112 to switch from sensor 101 to sensor 102 to achieve better light sensitivity. In some aspects, activation of an HDR photography mode may result in a switch to a particular one of the image sensors 101 or 102 with the highest dynamic range.

In any of these examples, an artifact may appear in the fused output of image frames captured in which there is some movement of a feature in the image between the image frames being fused. Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described herein may present other benefits than, and be used in other applications than, those described above.

In one aspect of a device 100, image frames captured from one or more of the image sensors 101 and 102 may be corrected, such as with rolling shutter correction (RSC), prior to fusion to form an HDR-enhanced image frame. For example, the input image frame from one sensor may be corrected based on motion data representing motion of the image capture device 100 during the capturing of the image frames by the sensors 101 and 102. Capturing of image frames for input to HDR processing techniques is described using an HDR image sensor with reference to FIGS. 2A-B and using a generic image sensor with reference to FIGS. 3-4.

Figure 2A:
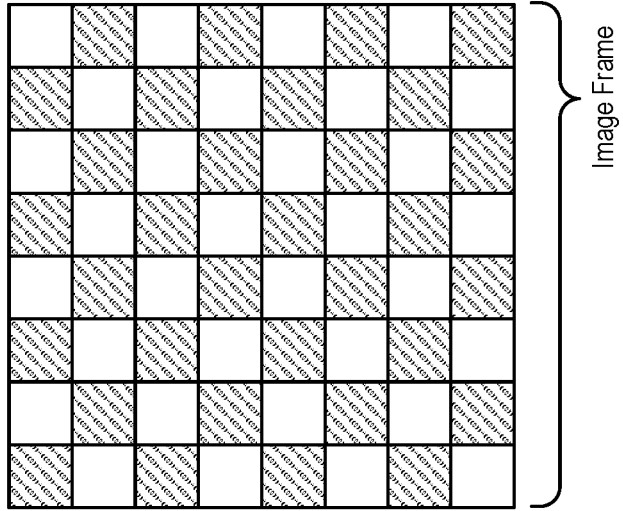
FIG. 2A illustrates a block diagram of an image frame captured for high dynamic range (HDR) processing according to some aspects of the disclosure.
Figure 2B:
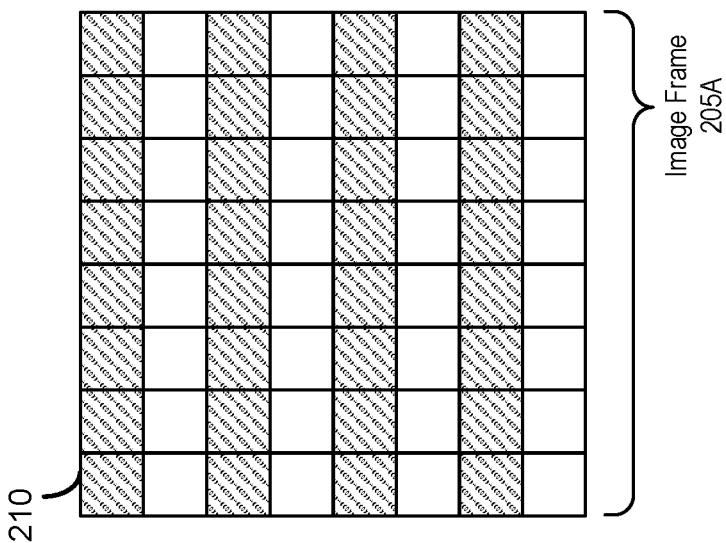
FIG. 2B illustrates a block diagram of an image frame captured for high dynamic range (HDR) processing according to some aspects of the disclosure.

FIG. 2A illustrates a block diagram of an image frame captured for high dynamic range (HDR) processing according to some aspects of the disclosure. In some aspects, a device may capture an image frame 205a with interlaced lines, in which each line corresponds to a different exposure. For example, a first array of pixels 215 may correspond to a first exposure length, and second array of pixels 220 may correspond to a second exposure length. The device may use different patterns of first and second arrays of pixels for capturing multiple image frames from a single image sensor, and another such example is illustrated in FIG. 2B. FIG. 2B illustrates a block diagram of an image frame captured for high dynamic range (HDR) processing according to some aspects of the disclosure. An image frame 205b may be captured using a zig-zag pattern between a first array of pixels 215, which may correspond to a first exposure length, and second array of pixels 220, which may correspond to a second exposure length. In some aspects, a device may support image capture with more than two exposure lengths. For example, an image frame 205 may be captured as three arrays of pixels with different exposure length, such as by an array of pixels comprising every third row in an image sensor.

Upon capture of an image using two or more exposure lengths, a device such as a device having an HDR sensor, may construct a final image using the array of pixels corresponding to different exposure lengths. Such reconstruction may be referred to, in some examples, as dynamic range compensation (DRC). For example, two or more snapshots having different exposures may be combined via image processing, such as in image signal processor 112. In some aspects, a device may include an HDR reconstruction module to combine captured image frames or image frames having multiple array of pixels of different exposure lengths as shown in FIGS. 2A-2B. For example, a device applying HDR reconstruction may capture a first array of pixels 215 at a shorter exposure and may capture a second array of pixels 220 at a longer exposure. When constructing the final image for an HDR photography output, the device may determine that a first pixel from the first array of pixels 215 is under exposed, and based on that determination, may instead use a second pixel from the second array of pixels 220 that was captured at a longer exposure.

Figure 3:
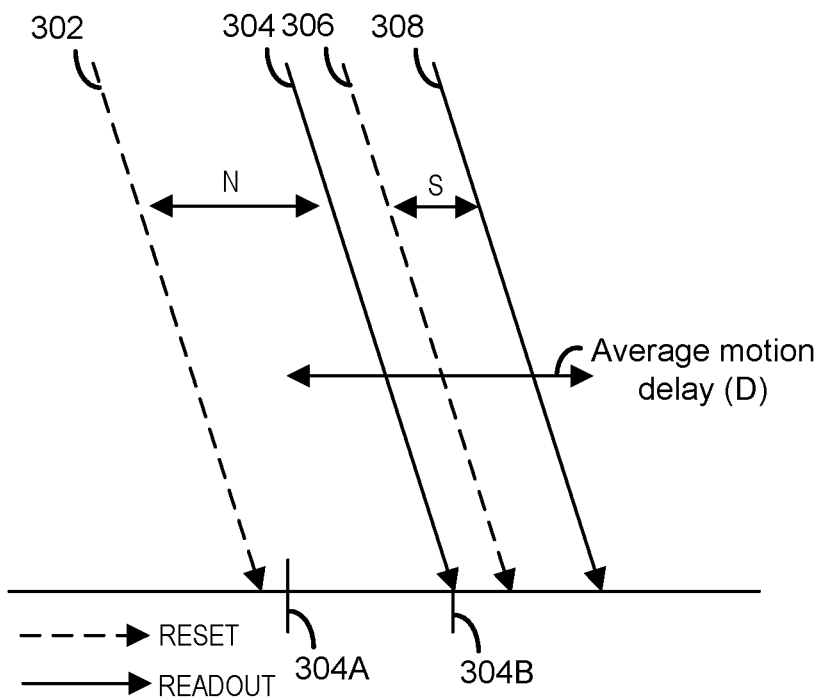
FIG. 3 is timing diagram illustrating capture of multiple image frames for HDR photography using a staggered HDR (sHDR) readout according to some aspects of the disclosure.

FIGS. 2A-2B illustrate the capturing of multiple image frames simultaneously from an HDR image sensor. The capturing of multiple image frames for HDR photography may alternatively be from an image sensor at different times as described with reference to FIGS. 3-4. FIG. 3 is timing diagram illustrating capture of multiple image frames for HDR photography using a staggered HDR (sHDR) readout according to some aspects of the disclosure. An HDR image capture begins at time 302 with resetting an image sensor, performing a first readout at time 304, resetting again at time 306, and performing a second readout at time 308. The readout at time 304 occurs a first exposure time N after the reset at time 302. The readout at time 308 occurs a second exposure time S after the reset at time 306. The exposure times N and S may be different, and the image frames resulting from the readouts at times 304 and 308 fused in an output frame for HDR photography. The readouts at times 304 and 308 may span a duration of time corresponding to the rolling readout of different portions of an image sensor. For example, the beginning of time 304 at 304A may correspond to readout of a first row of an image sensor, after which subsequent rows are readout sequentially, until a last row of the image sensor is readout at time 304B. The readout of the entire image sensor is not performed instantaneously but spans a duration of time proportional to a speed of the readout of separate portions of the image sensor.

Figure 4:
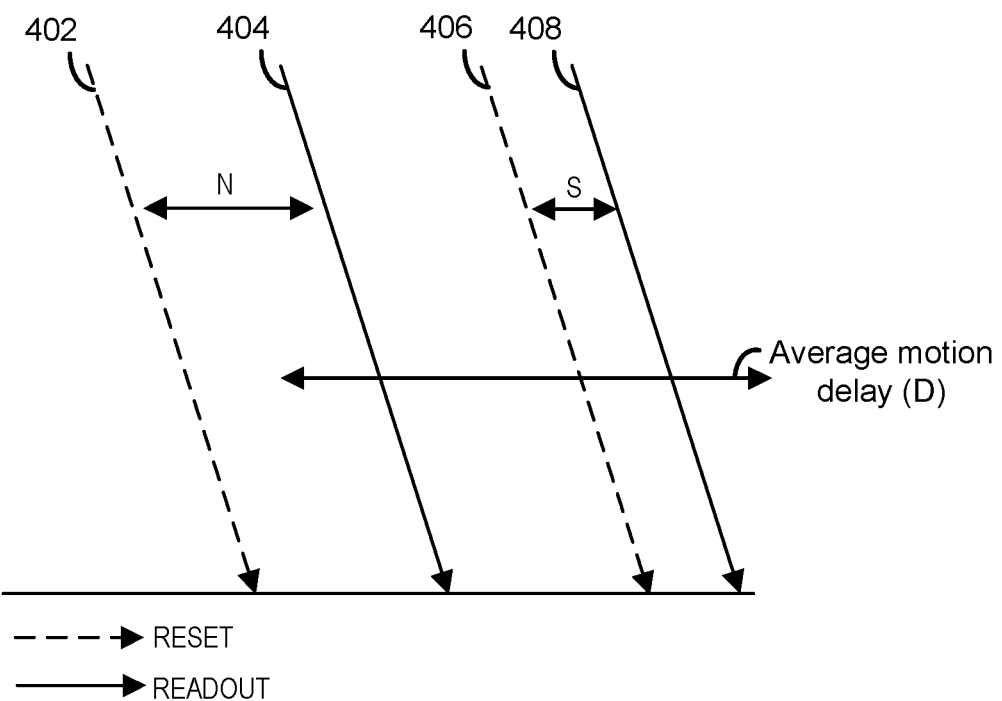
FIG. 4 is a timing diagram illustrating capture of multiple image frames for HDR photography using a staggered HDR (sHDR) readout according to some aspects of the disclosure.

An alternative capture technique for obtaining image frames for HDR processing according to aspects of this disclosure is shown in FIG. 4. FIG. 4 is a timing diagram illustrating capture of multiple image frames for HDR photography using multi-frame high dynamic range (MFHDR) readout according to some aspects of the disclosure. An HDR image capture begins at time 402 with resetting an image sensor, performing a first readout at time 404, resetting again at time 406, and performing a second readout at time 408. The readout at time 404 occurs a first exposure time N after the reset at time 402. The readout at time 408 occurs a second exposure time S after the reset at time 406. The exposure times N and S may be different, and the image frames resulting from the readouts at times 404 and 408 fused in an HDR-enhanced image frame for HDR photography.

Global motion may exist in image frames captured as described in FIGS. 2A, 2B, 3, and 4 and that motion may cause artifacts in the determined HDR-enhanced image frame. Referring to FIG. 3, one example of motion, global and local, may result from movement of an object changing the object's location in the scene between time 304 and 308. Referring again to FIG. 3, another example of motion may result from movement of the image sensor between time 304 and 308 that results in an apparent movement of an object in the scene. Rolling shutter motion may also generate motion. Rolling shutter refers to artifacts due to changes in the scene during the readout of separate portions, such as separate rows, of an image sensor. Referring again to FIG. 3, rolling shutter error may result from movement of the image sensor or movement of an object in the scene between time 304A and 304B.

A sequence of image frames output from image sensors used for HDR photography may be aligned to each other based on motion data regarding motion of the image capture device using electronic image stabilization (EIS). One example sequence of frames may include alternating long-exposure and short-exposure image frames. However, if EIS aligns image frames based on a long-exposure timestamp then the spatial location difference between two adjacent short frames may be larger. Similarly, if EIS aligns image frames based on a short-exposure timestamp then the spatial location difference between two adjacent long frames may be larger. These differences appear as wobbling artifacts in a recorded video with spatial motion differences between points in time being amplified further based on rolling shutter differences.

Artifacts due to motion may be reduced by applying a correction, such as rolling shutter correction (RSC), between long-exposure and short-exposure frames using motion data corresponding to movement during both the long-exposure and short-exposure captures. More generally, the RSC applied to one image frame in a sequence of frames may be based on motion data corresponding to the image frame being corrected and based on motion data regarding one or more other image frames in the sequence of image frames. Motion information may be extracted from feature-point-based image content analysis (such as from computer vision processing), from gyroscope data, or from motion detectors. The corrected image frames may then be aligned before fusion to form the HDR-enhanced image frame. In some aspects, EIS may be applied to some or all of the image frames, such as either the longer-exposure or shorter-exposure image frames to further smooth stabilization.

Figure 5A:
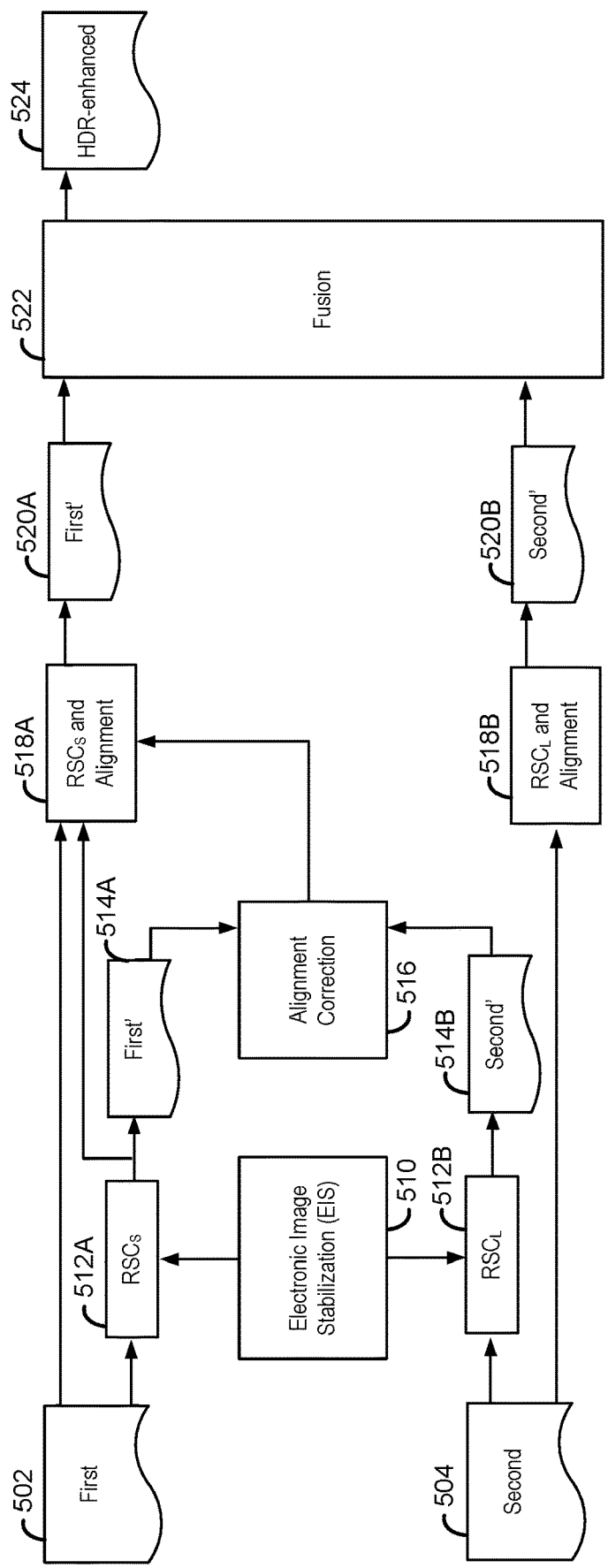
FIG. 5A is a block diagram illustrating computational processing with correction before alignment and fusion according to some aspects of the disclosure.

One example system for applying a rolling shutter correction (RSC) to image frames prior to alignment and fusion is shown in FIG. 5A. FIG. 5A is a block diagram illustrating high dynamic range (HDR) processing with correction before alignment and fusion according to some aspects of the disclosure. A first image frame 502 and a second image frame 504 may be input to HDR processing 500. Scaled versions of the image frames 502 and 504 may be input to rolling shutter correction blocks 512A and 512B, respectively. The RSC blocks 512A-B may apply correction based on motion data received from electronic image stabilization (EIS) block 510 to produce first corrected image frame 514A and second corrected image frame 514B. In some aspects, other motion data may be used alternatively or in addition to the EIS gyroscope in RSC blocks 512A-B. An alignment correction 516 determines an alignment correction, such as an alignment matrix and/or alignment grid, to align the first and second image frames 502 and 504 based on the first and second corrected image frames 514A and 514B. In some aspects, the aligning may include determining a first direction of global motion and determining an alignment correction that aligns the corrected first image frame to the corrected second image frame by shifting the corrected first image frame in a second direction opposite that of the first direction proportional to the amount of motion.

The alignment correction may be applied at correction block 518A to image frame 502 to generate corrected image frame 520A. Global and local alignment correction applied in correction block 518A may also include a rolling shutter correction (RSC). A correction block 518B may be applied to the image frame 504 to generate corrected image frame 520B. The corrected image frames 520A and 520B may be input to fusion processing block 522 to generate an HDR-enhanced image frame 524. In some aspects, the image frame 502 to which the alignment correction is applied at correction block 518A is the shorter-exposure image frame as shown in FIG. 5A, although the image frame 502 may alternatively be the longer-exposure image frame. In some aspects, the scaling of image frames 502 and 504 for processing in blocks 512A-B is a 1:2, 1:4, 1:8, 1:16, or 1:32 scaling. In some aspects, other scaling factors or no scaling may be applied to the image frames 502 and 504 for processing through blocks 512A, 512B, and 516.

Figure 5B:
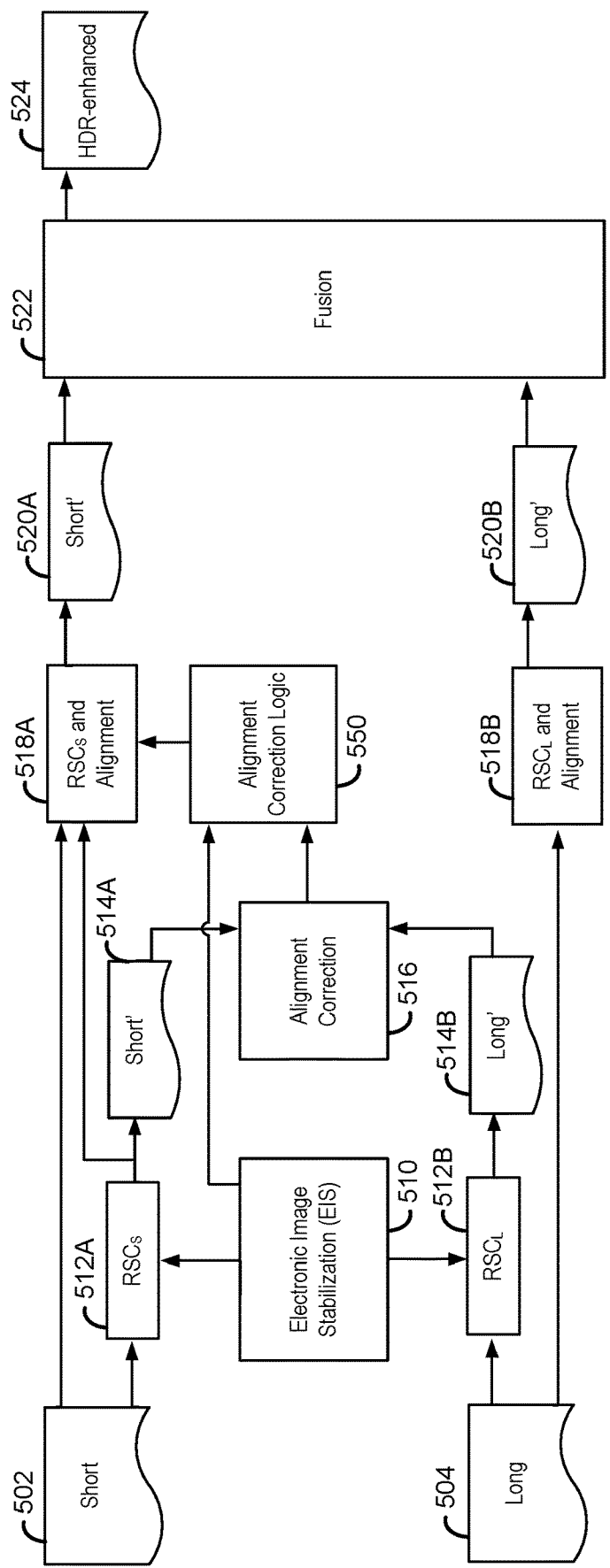
FIG. 5B is a block diagram illustrating high dynamic range (HDR) processing with correction before alignment and fusion according to some aspects of the disclosure.

The example system of FIG. 5A may apply corrections based on any motion data available regarding the image capture device motion. One example system of FIG. 5A using a combination of gyroscope data and computer vision processing (CVP) data for motion data is shown in FIG. 5B. FIG. 5B is a block diagram illustrating high dynamic range (HDR) processing with correction before alignment and fusion according to some aspects of the disclosure. Motion data from a gyroscope of the electronic image stabilization (EIS) block 510 may be used to determine an alignment correction applied at correction block 518A through alignment correction 516 and/or alignment correction logic 550. An alignment correction logic block 550 may receive an estimated alignment generated by alignment correction 516 and motion data from a gyroscope and/or from a computer vision processor (CVP). A computer vision processor (CVP) may perform feature matching between the image frames 502 and 504, determine feature distances between corresponding matched features in the frames 502 and 504, and determine motion data based on the feature distances. The motion data may include a distance component and a feature point offset component. The CVP may also generate metadata corresponding to the motion data, such as a confidence level for the motion data.

The alignment detection logic block 550 may determine an alignment correction based on one or a combination of the motion data available. For example, the alignment detection logic block 550 may default to determining alignment correction based on gyroscope data unless certain criteria are satisfied because gyroscope data is generally resilient to local motion. According to some aspects, the alignment detection logic block 550 may receive a first correction value from alignment correction 516, may determine a second correction value based on feature matching in CVP processing, and may determine to base an alignment correction on the CVP processing data or the gyroscope data or a combination of the data. I In some aspects, the alignment detection logic block 550 may determine the alignment correction based on the first correction value based on a first criteria and determine the alignment correction based on the second correction value based on a second criteria. In one example of first and second criteria, the alignment detection logic block 550 may determine a feature point offset component associated with the matched feature distance is below a first threshold, determine the alignment correction based on the second correction value when the feature point offset component is not below the first threshold, and determine the alignment correction based on the first correction value when the feature point offset component is below the first threshold. In some aspects, other data may be used in determining the alignment correction. For example, the alignment detection logic block 550 may determine a distance to an object in the first image frame is below a first depth threshold and determine the alignment correction based on the first correction value and the second correction value when the distance to the object is below the first depth threshold. The first correction value (from alignment correction 516) and the second correction value (from the computer vision processing) may be weighted based on the foreground and/or background object distance, such a difference between the foreground and background object distances. The weighting may depend on several factors: (1) gyro indicator, which means if the global motion is smaller than a certain threshold, more weighting on the first alignment correction 516 may be used to achieve robust image alignment; (2) feature point offset, which means if the feature point offset is larger than a certain threshold, such as in panning or shaking scenes, more weighting on the second alignment correction from CVP may be applied; and (3) distance between foreground and background objects, which means if the foreground objects are far closer than background objects and the distance difference is larger than a certain threshold, more weighting on the first alignment correction 516 may be applied. The distance to the object may be determined based on data from autofocus (AF) systems 133 or 134 and/or depth sensor 140.

In some aspects, image frames with shorter exposure times are captured earlier or later in the sequence of image frame captures than image frames with longer exposure times. Those two or more image frames captured in order from shorter exposure times to longer exposure times may be processed through the correction using motion data and subsequent fusion of corrected image frames to obtain an output for HDR photography. The capturing of shorter exposure frames earlier may be useful when a panning motion is occurring during the image capture. During panning, such as from left to right, the delay in short readout and panning movement results in the shorter-exposure image frame reflecting a different scene as compared to the longer-exposure image frame. When such image frames are fused, the mismatch results in a margin issue because the longer-exposure and shorter-exposure image frames do not overlap in a margin of the sensor. Capturing the shorter-exposure image frame first may speed up the process and reduce overlap mismatch after EIS margin cropping.

An example of HDR processing capturing the shorter-exposure image frame first is described with reference to FIGS. 6A-B. FIG. 6A is a timing diagram illustrating capturing image frames for high dynamic range (HDR) processing according to some aspects of the disclosure. An image sensor may be reset at time 602 and a shorter-exposure image frame readout at time 604, followed by another reset at time 606 and a longer-exposure image frame readout at time 608. This sequence may repeat multiple times to capture a series of images as part of an HDR-enhanced video sequence.

FIG. 6B is a block diagram illustrating high dynamic range (HDR) processing of two image capture frames with a shorter-exposure image frame captured before a longer-exposure image frame according to some aspects of the disclosure. A sequence 610 of alternating shorter-exposure and longer-exposure image frames including frame $S_{n-1}$ 612, $L_{n-1}$ 614, $S_n$ 616, and $L_n$ 618 may be captured from one or more image sensors. At image alignment stage block 620, frame $S_n$ 616 is aligned and cropped to match frame $L_n$ 618 such that an image feature 648 is in a similar or same location in cropped frame $S'_n$ 622. At EIS stage block 630, cropped frame $S'_n$ 622 is again cropped as frame $S''_n$ 632 to match frame $L_{n-1}$ 614 and frame $L_n$ 618 is cropped as frame $L'_n$ 634 to match frame $L_{n-1}$ 614. Frame $S''_n$ 632 is then fused with frame $L'_n$ 634 to generate fused frame 640. Fused frame 640 is then cropped 642 to remove a stabilization margin, which may be pixels marked as invalid due to being in an out-of-image-boundary, to obtain an output image 650 with limited or no margin issues. In some aspects, these invalid pixels that are cropped out are padded black pixels from an earlier stage that are removed to prevent from the appearance of a black boundary.

Figure 7:
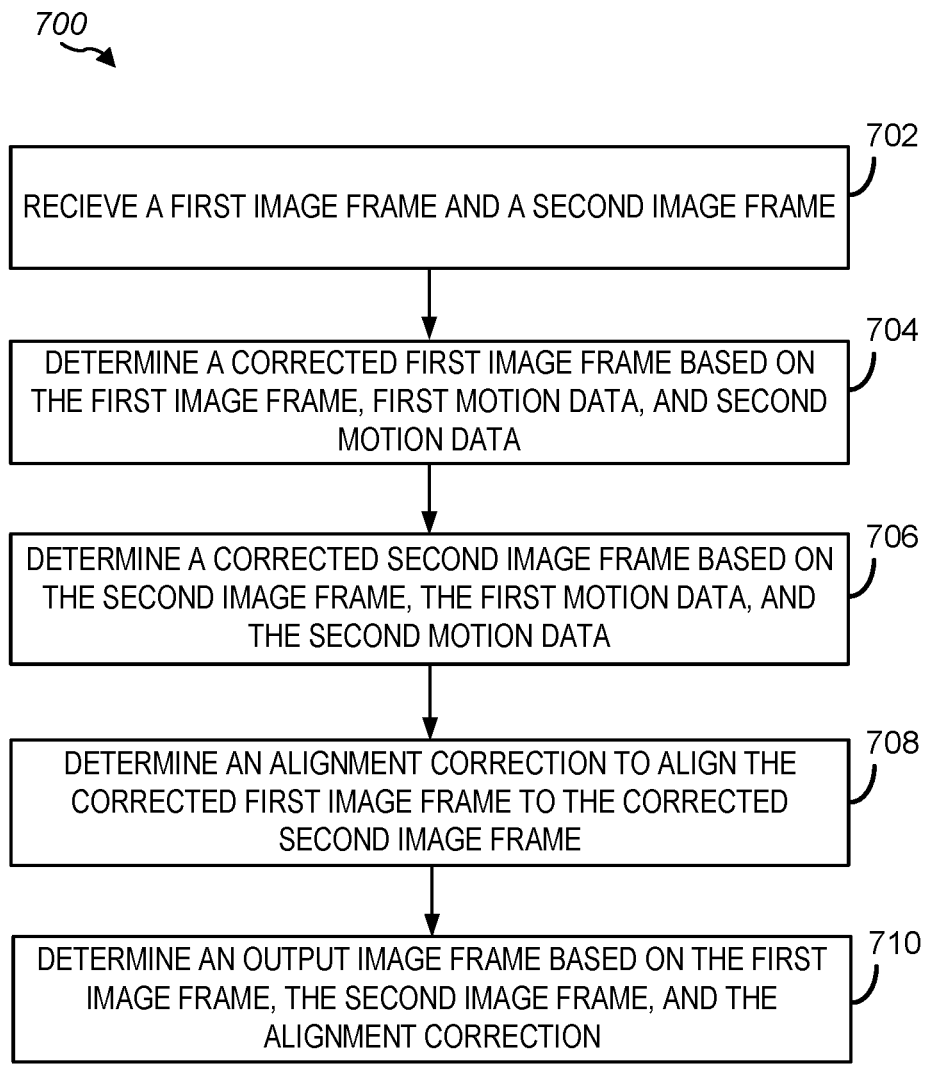
FIG. 7 is a flow chart illustrating a method of computational processing of image frames with correction before alignment and fusion according to some aspects of the disclosure.

One method for HDR processing employing techniques described herein is described with reference to FIG. 7. FIG. 7 is a flow chart illustrating a method of high dynamic range (HDR) processing of image frames with correction before alignment and fusion according to some aspects of the disclosure. A method 700 begins at block 702 with receiving a first image frame captured at a first exposure time and receiving a second image frame captured at a second exposure time different from the first exposure time. The images may be captured from one or more image sensors, such as according to the techniques described above with reference to FIG. 2A, FIG. 2B, FIG. 3, or FIG. 4. In some aspects, the receiving of block 702 may be from a stored file, such as when the HDR processing is executed on the image frames one a different device or at a different time than the device or time the images are captured, or when the HDR processing is executed on generated content.

At block 704, the method 700 continues with determining a corrected first image frame based on the first image frame, first motion data, and second motion data. The first motion data may correspond to motion of a first image sensor while capturing the first image frame, and the second motion data may correspond to motion of a second image sensor while capturing the second image frame. The motion data may be obtained from a gyroscope in an electronic image stabilization (EIS) block of an image capture device, from a separate gyroscope, accelerometer, or other sensor, determined based on a different between two image frames captured by the same or different sensors. In some aspects, the correction is based on motion data corresponding to the capture of all of the image frames being fused in the HDR processing, which may be three or more image frames. At block 706, the method 700 continues with determining a corrected second image frame based on the second image frame, the first motion data, and the second motion data.

The RSC-corrected image frames may be aligned and fused to generate an HDR-enhanced image frame as an output image frame. At block 708, the method 700 continues with determining an alignment correction to align the corrected first image frame to the corrected second image frame. The determined alignment correction may be based on motion data from the EIS gyroscope, computer vision processing, and/or other sensors. At block 710, the method 700 continues with determining an output image frame based on the first image frame, the second image frame, and the alignment correction.

Figure 8:
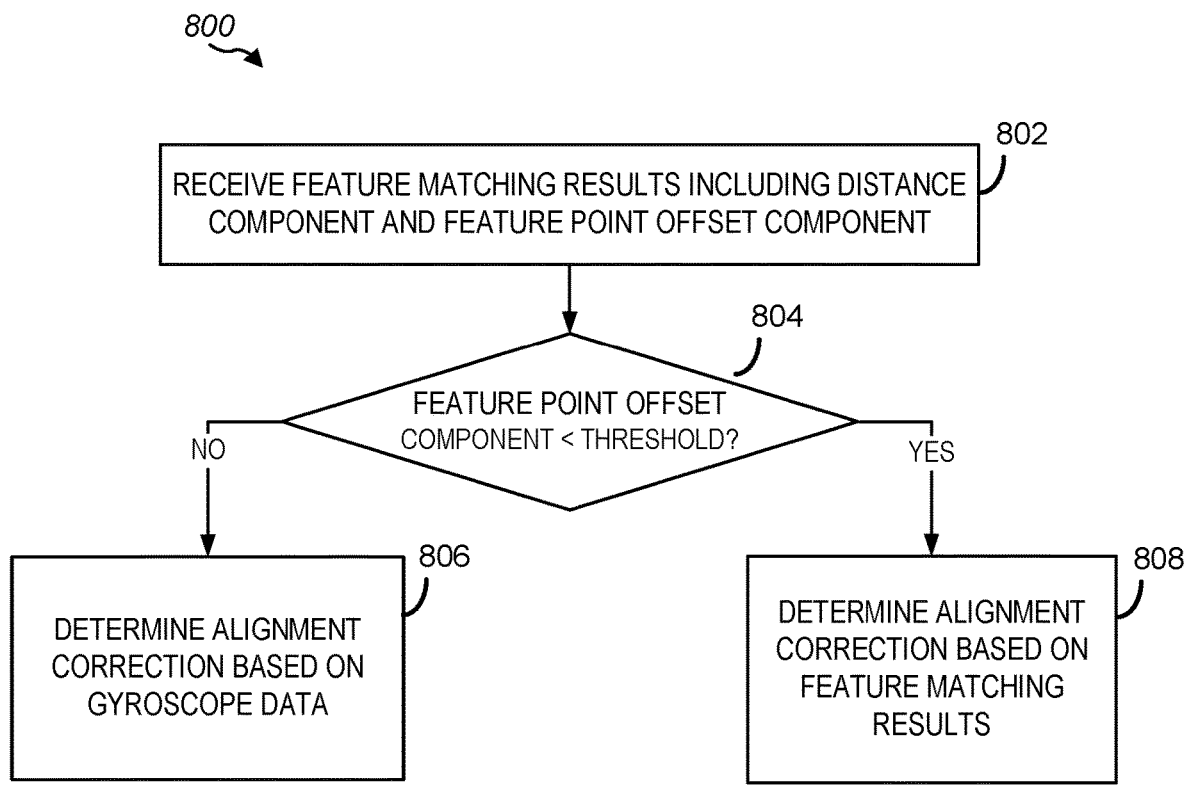
FIG. 8 is a flow chart illustrating a method of determining motion data for use in aligning input image frames in computational processing according to some aspects of the disclosure.

The alignment correction at block 708 may be based on one or more determinations based on predetermined criteria. One example criterion for determining the alignment correction is described with reference to FIG. 8. FIG. 8 is a flow chart illustrating a method of determining motion data for use in aligning input image frames in high dynamic range (HDR) processing according to some aspects of the disclosure. A method 800 begins at block 802 with receiving feature matching results from computer vision processing (CVP) including a gyro-indicator component (e.g., an indicator determining whether global movement determined from gyroscope data is small such that the movement is below a threshold), a feature point offset component, and a distance detection component. At block 804, the alignment correction is determined based the values of one or more of these components, such as on an outcome of whether these components are below or not below than threshold levels. In some aspects, a confidence level of the feature point offset component determined during feature matching may also be a criterion for determining how to determine the alignment correction. At block 804, if the feature point offset component is not larger than a threshold level or the CVP confidence is lower than a threshold level, the alignment correction is determined based on gyroscope data. At block 806, if the feature point offset component is not below than a threshold level, and in some aspects the CVP confidence level is also above a threshold level, then the alignment correction is determined based on the feature matching results including the distance component. The method 800 may be executed by the alignment correction logic 550 in the system of FIG. 5B.

Figure 9:
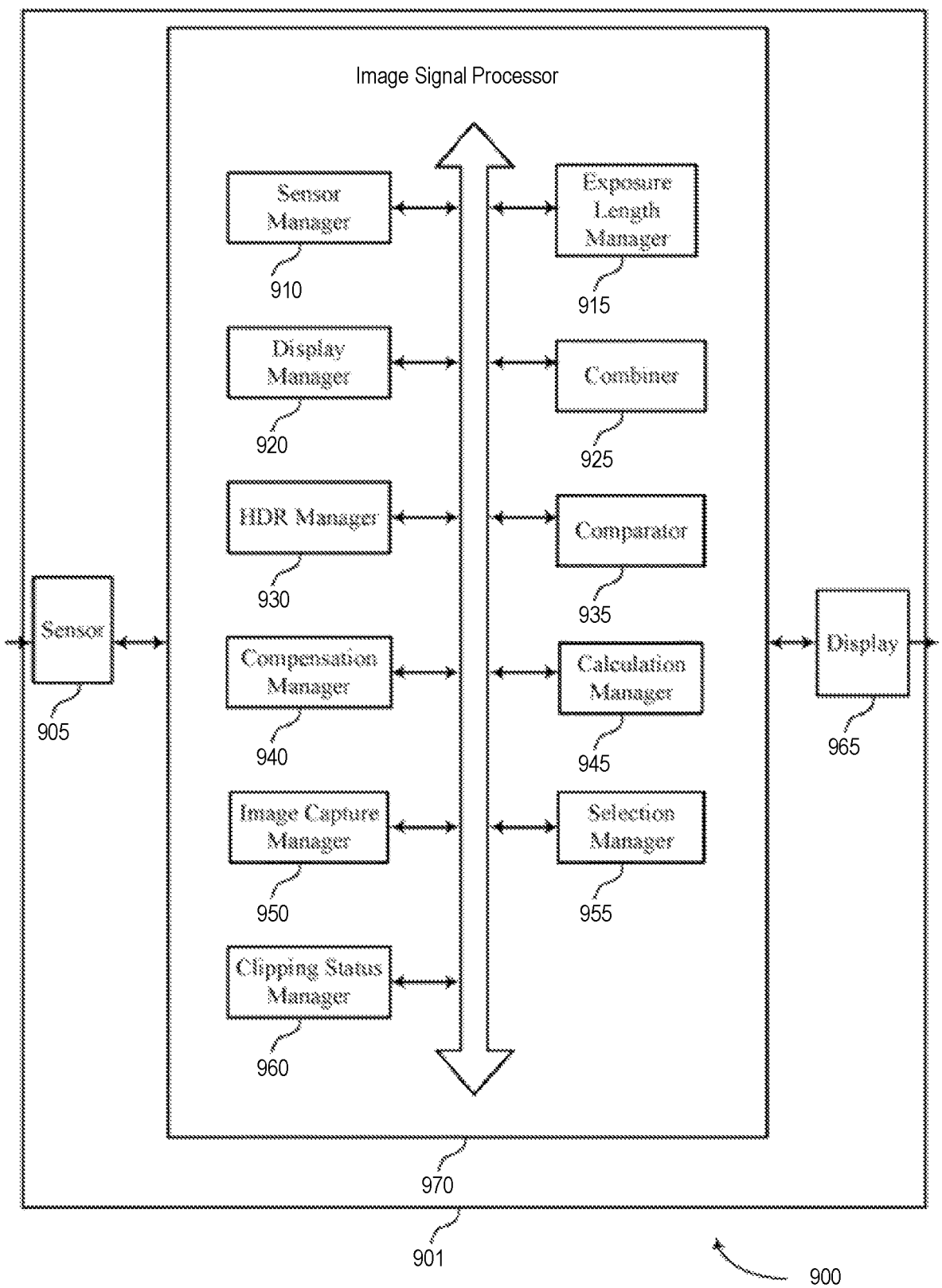
FIG. 9 is a block diagram illustrating modules of an image signal processor for supporting high dynamic range (HDR) photography according to some aspects of the disclosure.

Aspects of the techniques for HDR photography described herein may be incorporated into an image signal processor such as described with reference to FIG. 9 or other processing devices. FIG. 9 is a block diagram illustrating modules of an image signal processor for supporting high dynamic range (HDR) photography according to some aspects of the disclosure. A system 900 includes a device 901 that supports HDR photography, including the capture of still HDR-enhanced image frames or a video sequence of HDR-enhanced image frames, in accordance with aspects of the present disclosure. The device 901 may be an example of aspects of a device as described herein. The device 901 may include an image sensor 905, an image signal processor 590, and a display 965. The device 901 may also include a central processing unit (CPU). Each of these components may be in communication with one another (e.g., via one or more buses). The image sensor 905 may capture a first image frame using an initial exposure. Image sensor 905 may be controlled by sensor manager 910, an exposure length manager 915, an HDR manager 930, and/or an image capture manager 950, as described below. The image sensor 905 may be used to capture an image frame such as image frame 205a or 205b and an array of pixels such as first array of pixels 215 or second array of pixels 220 as described with reference to FIG. 2.

Image signal processor 970 may be an example of a device with an image capturing ability as described with respect to FIG. 3, FIG. 4, FIG. 5A, FIG. 5B, FIG. 6A, FIG. 6B, FIG. 7 and/or FIG. 8. The image signal processor 970 may include a sensor manager 910, an exposure length manager 915, a display manager 920, a combiner 925, an HDR manager 930, a comparator 935, a compensation manager 940, a calculation manager 945, an image capture manager 950, a selection manager 955, and a clipping status manager 960. Each of these modules may communicate, directly or indirectly, with one another (e.g., via one or more buses).

Image signal processor 970 or its sub-components, may be implemented in hardware, code (e.g., software or firmware) executed by a processor, or any combination thereof. If implemented in code executed by a processor, the functions of the image signal processor 970, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The image signal processor 970, or its sub-components, may be physically located at various positions, including being distributed such that portions of functions are implemented at different physical locations by one or more physical components. In some examples, the image signal processor 970, or its sub-components, may be a separate and distinct component in accordance with various aspects of the present disclosure. In some examples, the image signal processor 970, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Sensor manager 910 and exposure length manager 915 may determine exposure times for capturing the multiple image frames to be fused in the HDR processing executed on image signal processor 970. The sensor manager 910 may capture from an image sensor a first image frame using an initial exposure length. In some aspects, sensor manager 910 may determine that the clipping status indicates that the first image frame is overexposed, the predicted exposure length is shorter than the initial exposure length, and the hedged exposure length is shorter than the predicted length. In some aspects, sensor manager 910 may determine that the clipping status indicates that the first image frame is underexposed, the predicted exposure length is longer than the initial exposure length, and the hedged exposure length is longer than the predicted length. The exposure length manager 915 may calculate, based on a clipping status of a set of one or more pixels of the first image frame, a predicted exposure length and a hedged exposure length, where the predicted exposure length is different from the hedged exposure length by at least a threshold. In some aspects, the exposure length manager 915 may capture from the sensor a first array of pixels using the predicted exposure length and a second array of pixels using the hedged exposure length. In some examples, the exposure length manager 915 may capture from the sensor a second image frame using a converged exposure length, in which the converged exposure length is based on a comparison of a saturation of the first array of pixels to a saturation of the second array of pixels. In some examples, the exposure length manager 915 may determine the converged exposure length such that the converged exposure length has an exposure length between the predicted exposure length and the hedged exposure length. In some aspects, the exposure length manager 915 may determine that the converged exposure length is equal to the predicted exposure length or is equal to the hedged exposure length based on detecting clipping in the first array of pixels or the second array of pixels. In some aspects, the exposure length manager 915 may determine that the converged exposure length is equal to the predicted exposure length or is equal to the hedged exposure length based on the determined average pixel values. In some aspects, exposure length manager 915 may determine that the hedged exposure length is not under-exposed, where selecting the second exposure length further includes setting the second exposure length equal to the hedged exposure length. In some aspects, exposure length manager 915 may determine that the converged exposure length is equal to the predicted exposure length or is equal to the hedged exposure length.

The calculation manager 945 may calculate, based on a clipping status of a set of one or more pixels of a first image frame associated with a first exposure length, an exposure correction direction, a predicted exposure length correction, and a hedged exposure length correction that is greater than the predicted exposure length correction by at least a threshold in the exposure correction direction.

The image capture manager 950 may capture from a sensor a first array of pixels using the predicted exposure length correction and a second array of pixels using the hedged exposure length correction. The selection manager 955 may select a second exposure length based on a comparison of the first array of pixels to the second array of pixels.

The HDR manager 930 may capture the first array of pixels and the second array of pixels in parallel when determining that the image sensor 905 is an HDR sensor capable of supporting multiple exposure lengths, such as described in FIG. 2A and FIG. 2B. The HDR manager 930 may otherwise capture two image frames in series when determining that the image sensor 905, such as described in FIG. 3 and FIG. 4.

The comparator 935 may detect clipping in the first array of pixels or the second array of pixels, where the comparison of the saturation of first array of pixels to the saturation of the second array of pixels is based on the detected clipping. In some aspects, the comparator 935 may determine average pixel values in the first array of pixels and the second array of pixels, in which a comparison of the saturation of the first array of pixels to the saturation of the second array of pixels is based on the average pixel values.

The compensation manager 940 may apply a digital gain compensation to the first array of pixels. In some aspects, the hedged exposure length correction is overexposed, and in which capturing the second array of pixels includes applying a digital gain compensation to the first array of pixels.

The clipping status manager 960 may determine that the clipping status of the set of one or more pixels of the first image frame indicates that the first exposure length is underexposed, and the exposure correction direction may be an increase in exposure.

The combiner 925 may fuse multiple image frames captured in accordance with determinations by the exposure length manager 915 and sensor manager 910, such as by combining the first array of pixels and the second array of pixels.

The display manager 920 may output one or more of the input image frames or the HDR-enhanced image frame generated by the combiner 925.

Figure 10:
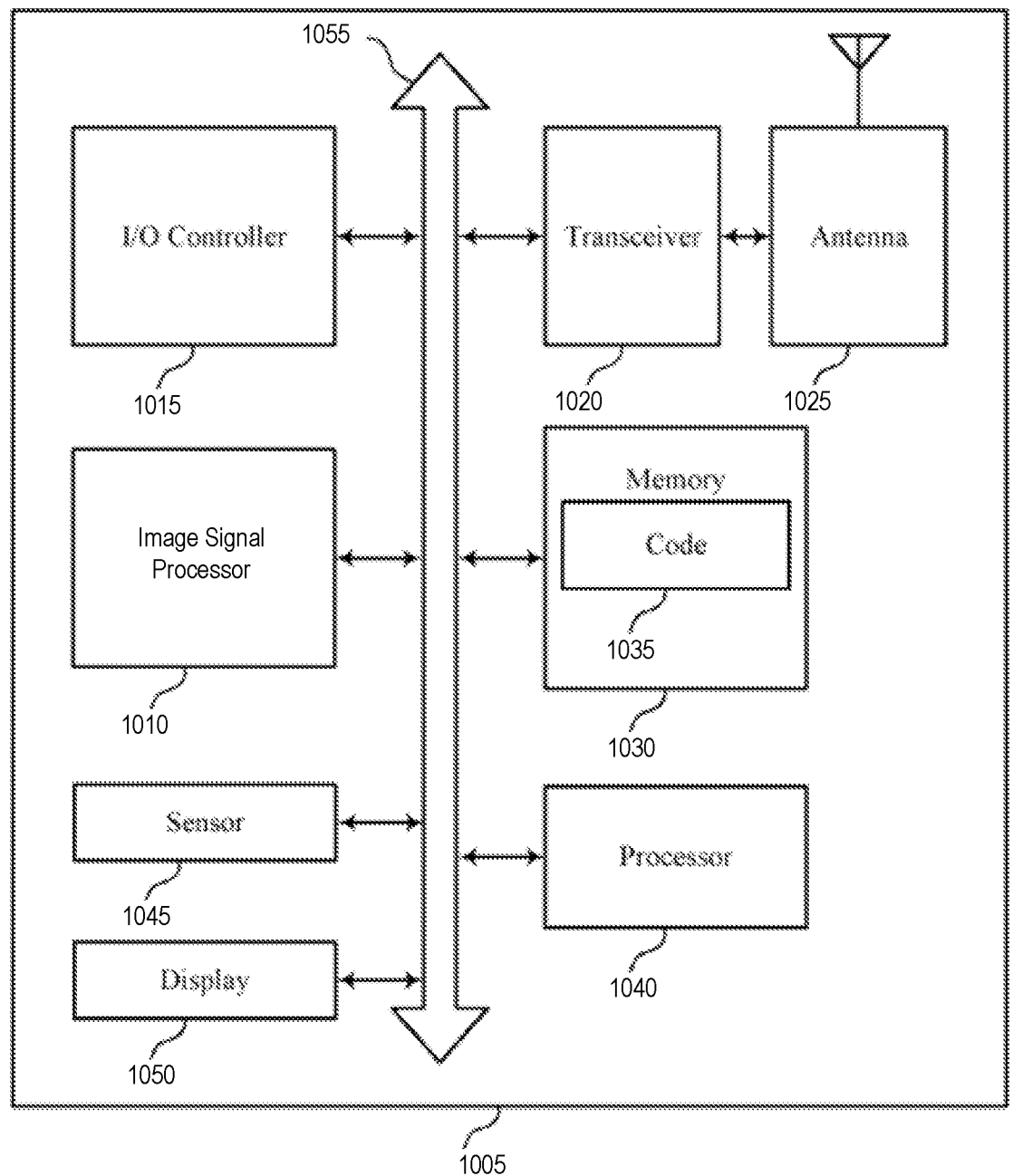
FIG. 10 is a block diagram illustrating modules of an image capture device for supporting high dynamic range (HDR) photography according to some aspects of the disclosure.

The image signal processor 970 may be implemented in a device, such as a user equipment (UE) device on a wireless network. One example aspect of a user equipment (UE) device with image signal processor 970 is described with reference to FIG. 10. FIG. 10 is a block diagram illustrating modules of an image capture device for supporting high dynamic range (HDR) photography according to some aspects of the disclosure. A system 1000 includes a device 1005 that supports HDR photography in accordance with aspects of the present disclosure. The device 1005 may be an example of or include the components of device 1001, or a device as described herein. The device 1005 may include components for bi-directional voice and data communications including components for transmitting and receiving communications, including an image signal processor 1010, an I/O controller 1015, a transceiver 1020, an antenna 1025, memory 1030, and a processor 1040. These components may be in electronic communication via one or more buses (e.g., bus 1055).

The image sensor 1045 may capture a first image frame using an initial exposure. The sensor 1045 may be utilized to capture an image frame such as image frame 205 and an array of pixels such as first array of pixels 215 or second array of pixels 120 as described with reference to FIG. 2. Image sensor 1045 may also capture subsequent images using a hedged exposure and/or a predicted exposure.

The image signal processor 1010 may manage or trigger capture from sensor 1045 of a first image frame using an initial exposure length, calculate, based on a clipping status of a set of one or more pixels of the first image frame, a predicted exposure length and a hedged exposure length, where the predicted exposure length is different from the hedged exposure length by at least a threshold, and may manage or trigger capture from the image sensor 1045, a first array of pixels using the predicted exposure length and a second array of pixels using the hedged exposure length. Image signal processor 1010 may manager or trigger capture from the image sensor 1045 a second image frame using a converged exposure length, where the converged exposure length is based on a comparison of a saturation of the first array of pixels to a saturation of the second array of pixels and output the second image frame. The image signal processor 1010 may also determine the converged exposure length such that the converged exposure length has an exposure length between the predicted exposure length and the hedged exposure length and in which combining the first array of pixels and the second array of pixels is based on the determining.

The image signal processor 1010 may also calculate, based on a clipping status of a set of one or more pixels of a first image frame associated with a first exposure length, an exposure correction direction, a predicted exposure length correction, and a hedged exposure length correction that is greater than the predicted exposure length correction by at least a threshold in the exposure correction direction. The image signal processor 1010 may capture from an image sensor 1045 a first array of pixels using the predicted exposure length correction and a second array of pixels using the hedged exposure length correction, select a second exposure length based on a comparison of the first array of pixels to the second array of pixels, and output a second image frame to a display 1050 based on the second exposure length. In some aspects, the converged exposure length is equal to the predicted exposure length or is equal to the hedged exposure length.

The display 1050 may output one or more captured image frames, such as the second image frame. In some aspects, the second image frame may be based on a second exposure length.

The I/O controller 1015 may manage input and output signals for the device 1005. The I/O controller 1015 may also manage peripherals not integrated into the device 1005. In some aspects, the I/O controller 1015 may represent a physical connection or port to an external peripheral. In some aspects, the I/O controller 1015 may utilize an operating system such as iOS®, ANDROID®, MS-DOS®, MS-WINDOWS®, OS/2®, UNIX®, LINUX®, or another known operating system. In other aspects, the I/O controller 1015 may represent or interact with a modem, a keyboard, a mouse, a touchscreen, or a similar device. In some aspects, the I/O controller 1015 may be implemented as part of a processor. In some aspects, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the wireless device may include a single antenna 1025. However, in some aspects the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some aspects, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some aspects, the processor 1040 may be configured to operate a memory array using a memory controller. In other aspects, a memory controller may be integrated into the processor 1040. The processor 1040 may be configured to execute computer-readable instructions stored in a memory (e.g., the memory 1030) to cause the device 1005 to perform various functions (e.g., functions or tasks supporting AEC predictive convergence).

The code 1035 may include instructions to implement aspects of the present disclosure, including instructions to support image processing. The code 1035 may be stored in a non-transitory computer-readable medium such as system memory or other type of memory. In some aspects, the code 1035 may not be directly executable by the processor 1040 but may cause a computer (e.g., when compiled and executed) to perform functions described herein.

In one or more aspects, techniques for supporting image capture with reduced blur may include additional aspects, such as any single aspect or any combination of aspects described below or in connection with one or more other processes or devices described elsewhere herein. In one or more aspects, supporting frame alignment in a sequence of computationally-enhanced image frames forming a video may include performing a method including receiving a first image frame (such as captured using a first exposure time) and a second image frame (such as using a second exposure time that may be the same as or different from the first exposure time). The method may also include determining a corrected first image frame based on the first image frame, first motion data corresponding to the first image frame, and second motion data corresponding to the second image frame. The method may further include determining a corrected second image frame based on the second image frame, the first motion data, and the second motion data. The method may also include determining an alignment correction to align the corrected first image frame to the corrected second image frame. The method may further include determining a fused image frame based on the first image frame, the second image frame, and the alignment correction. Additionally, the method may be performed by an apparatus including a wireless device, such as a UE. In some implementations, the apparatus may include at least one processor, and a memory coupled to the processor. The processor may be configured to perform operations described herein with respect to the apparatus. In some other implementations, the method may be embedded in a non-transitory computer-readable medium in program code recorded thereon and the program code may be executable by a computer for causing the computer to perform operations described herein with reference to the apparatus. In some implementations, the method may be performed by one or more means configured to perform operations described herein. In some implementations, a method of wireless communication may include one or more operations described herein with reference to the apparatus.

In a second aspect, in combination with the first aspect, determining a corrected first image frame includes applying a first rolling shutter correction (RSC) to the first image frame. Determining a corrected second image frame includes applying a second rolling shutter correction (RSC) to the second image frame, the first rolling shutter correction (RSC) and the second rolling shutter correction (RSC) based on both the first motion data and the second motion data.

In a third aspect, in combination with one or more of the first aspect or the second aspect, the first motion data and the second motion data include gyroscope data.

In a fourth aspect, in combination with one or more of the first aspect through the third aspect, determining an alignment correction includes determining a first correction value based on the first motion data and the second motion data.

In a fifth aspect, in combination with the fourth aspect, determining an alignment correction includes determining matched features between the first image frame and the second image frame, and determining a second correction value based on a matched feature distance between the matched features. The alignment correction is based on determining matched features between the first image frame and the second image frame. The matched features may be determined by a matching algorithm executing on a processor, a computer vision processor, or other hardware configured to compare two or more image frames and identify similarities, such as using computer vision operations for identifying common objects, places, or faces in the two or more image frames.

In a sixth aspect, in combination with the fifth aspect, determining an alignment correction further includes determining, when a first criteria is met, the alignment correction based on the first correction value, and determining, when a second criteria is met, the alignment correction based on the second correction value. In some aspects, both correction values may be used in determining the alignment correction by weighting the contribution of the two correction values to the alignment correction based on one or more criteria.

In a seventh aspect, in combination with one or more of the fifth aspect through the sixth aspect, determining an alignment correction further includes determining a feature point offset component associated with the matched feature distance, determining the alignment correction based on the second correction value when the feature point offset component is not below a first threshold, and determining the alignment correction based on the first correction value when the feature point offset component is below the first threshold.

In an eighth aspect, in combination with one or more of the fifth aspect through the seventh aspect, determining an alignment correction further includes determining whether a distance difference between foreground and background objects in the first image frame is below a first depth threshold, determining the alignment correction based on the first correction value when the distance difference is not below the first depth threshold, and determining the alignment correction based on the second correction value when the distance difference is below the first depth threshold.

In a ninth aspect, in combination with one or more of the first aspect through the eighth aspect, the apparatus is configured to capture the first image frame at the first exposure time, and capture the second image frame at the second exposure time after capturing the first image frame. The second exposure time is longer than the first exposure time. The capturing may be performed with image sensors such as those described herein.

In a tenth aspect, in combination with one or more of the first aspect through the ninth aspect, determining an alignment correction includes determining a first direction of global motion, and aligning the corrected first image frame to the corrected second image frame in a second direction opposite that of the first direction.

In one or more aspects, techniques for supporting a device, including a processor; and a memory coupled to the processor and storing instructions that, when executed by the processor, cause the device to perform operations may include additional aspects, such as any single aspect or any combination of aspects described below or in connection with one or more other processes or devices described elsewhere herein. In an eleventh aspect, supporting frame alignment in a sequence of computationally-enhanced image frames forming a video may include an apparatus configured to receive a first image frame (such as captured using a first exposure time) and a second image frame (such as using a second exposure time that may be the same as or different from the first exposure time). The apparatus may be also configured to determine a corrected first image frame based on the first image frame, first motion data corresponding to the first image frame, and second motion data corresponding to the second image frame. The apparatus may further be configured to determine a corrected second image frame based on the second image frame, the first motion data, and the second motion data. The apparatus may further be configured to determine an alignment correction to align the corrected first image frame to the corrected second image frame. The apparatus may further be configured to determine a fused image frame based on the first image frame, the second image frame, and the alignment correction. Additionally, the apparatus may perform or operate according to one or more aspects as described below. In some implementations, the apparatus includes a wireless device, such as a user equipment (UE) or base station (BS). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein.

In a twelfth aspect, in combination with one the eleventh aspect, determining a corrected first image frame includes applying a first rolling shutter correction (RSC) to the first image frame. Determining a corrected second image frame includes applying a second rolling shutter correction (RSC) to the second image frame, the first rolling shutter correction (RSC) and the second rolling shutter correction (RSC) based on both the first motion data and the second motion data.

In a thirteenth aspect, in combination with one or more of the eleventh aspect through the twelfth aspect, the first motion data and the second motion data include gyroscope data.

In a fourteenth aspect, in combination with one or more of the eleventh aspect through the thirteenth aspect, determining an alignment correction includes determining a first correction value based on the first motion data and the second motion data.

In a fifteenth aspect, in combination with the fourteenth aspect, determining an alignment correction includes determining matched features between the first image frame and the second image frame, and determining a second correction value based on a matched feature distance between the matched features. The alignment correction is based on determining matched features between the first image frame and the second image frame.

In a sixteenth aspect, in combination with the fifteenth aspect, determining an alignment correction further includes determining, when a first criteria is met, the alignment correction based on the first correction value, and determining, when a second criteria is met, the alignment correction based on the second correction value.

In a seventeenth aspect, in combination with one or more of the fifteenth aspect through the sixteenth aspect, determining an alignment correction further includes determining a feature point offset component associated with the matched feature distance, determining the alignment correction based on the second correction value when the feature point offset component is not below a first threshold, and determining the alignment correction based on the first correction value when the feature point offset component is below the first threshold.

In a eighteenth aspect, in combination with one or more of the fifteenth aspect through the seventeenth aspect, determining an alignment correction further includes determining whether a distance difference between foreground and background objects in the first image frame is below a first depth threshold, determining the alignment correction based on the first correction value when the distance difference is not below the first depth threshold, and determining the alignment correction based on the second correction value when the distance difference is below the second depth threshold.

In a nineteenth aspect, in combination with one or more of the eleventh aspect through the eighteenth aspect, the instructions, when executed by the processor, cause the device to perform further operations including capturing the first image frame at the first exposure time, and capturing the second image frame at the second exposure time after capturing the first image frame. The second exposure time is longer than the first exposure time.

In a twentieth aspect, in combination with one or more of the eleventh aspect through the eighteenth aspect, determining an alignment correction includes determining a first direction of global motion, and aligning the corrected first image frame to the corrected second image frame in a second direction opposite that of the first direction.

In one or more aspects, techniques for supporting a non-transitory computer-readable medium storing instructions that, when executed by a processor of a device, cause the device to perform operations may include additional aspects, such as any single aspect or any combination of aspects described below or in connection with one or more other processes or devices described elsewhere herein. In a twenty-first aspect, supporting frame alignment in a sequence of computationally-enhanced image frames forming a video may include a non-transitory computer-readable medium storing instructions that, when executed by a processor of a device, cause the device to perform operations including receiving a first image frame (such as captured using a first exposure time) and a second image frame (such as using a second exposure time that may be the same as or different from the first exposure time); determining a corrected first image frame based on the first image frame, first motion data corresponding to the first image frame, and second motion data corresponding to the second image frame; determining a corrected second image frame based on the second image frame, the first motion data, and the second motion data; determining an alignment correction to align the corrected first image frame to the corrected second image frame; and/or determining a fused image frame based on the first image frame, the second image frame, and the alignment correction. Additionally, the instructions cause an apparatus to perform or operate according to one or more aspects as described below. In some implementations, the apparatus includes a wireless device, such as a base station (BS) or user equipment (UE). In some implementations, the apparatus may include at least one processor, and a memory coupled to the processor. In some aspects, the processor is an image signal processor that further includes circuitry configured to perform other image functions described herein. The processor may be configured to perform operations described herein with respect to the apparatus. In some other implementations, the non-transitory computer-readable medium having program code recorded thereon and the program code may be executable by a computer for causing the computer to perform operations described herein with reference to the apparatus.

In a twenty-second aspect, in combination with the twenty-first aspect, determining a corrected first image frame includes applying a first rolling shutter correction (RSC) to the first image frame. Determining a corrected second image frame includes applying a second rolling shutter correction (RSC) to the second image frame, the first rolling shutter correction (RSC) and the second rolling shutter correction (RSC) based on both the first motion data and the second motion data.

In a twenty-third aspect, in combination with one or more of the twenty-first aspect through the twenty-second aspect, the first motion data and the second motion data include gyroscope data.

In a twenty-fourth aspect, in combination with one or more of the twenty-first aspect through the twenty-third aspect, determining an alignment correction includes determining a first correction value based on the first motion data and the second motion data.

In a twenty-fifth aspect, in combination with the twenty-fourth aspect, determining an alignment correction includes determining matched features between the first image frame and the second image frame, and determining a second correction value based on a matched feature distance between the matched features. The alignment correction is based on determining matched features between the first image frame and the second image frame.

In a twenty-sixth aspect, in combination with o the twenty-fifth aspect, determining an alignment correction further includes determining, when a first criteria is met, the alignment correction based on the first correction value, and determining, when a second criteria is met, the alignment correction based on the second correction value.

In a twenty-seventh aspect, in combination with one or more of the twenty-fifth aspect through the twenty-sixth aspect, determining an alignment correction further includes determining a feature point offset component associated with the matched feature distance, determining the alignment correction based on the first correction value when the feature point offset component is below a first threshold, and determining the alignment correction based on the second correction value when the feature point offset component is not below the first threshold.

In a twenty-eighth aspect, in combination with one or more of the twenty-fifth aspect through the twenty-seventh aspect, determining an alignment correction further includes determining whether a distance difference between foreground and background objects in the first image frame is below a first depth threshold, determining the alignment correction based on the first correction value when the distance difference is not below the first depth threshold, and determining the alignment correction based on the second correction value when the distance difference is below the first depth threshold.

In a twenty-ninth aspect, in combination with one or more of the twenty-first aspect through the twenty-eighth aspect, the instructions, when executed by the processor, cause the device to perform further operations including capturing the first image frame at the first exposure time, and capturing the second image frame at the second exposure time after capturing the first image frame. The second exposure time is longer than the first exposure time. In an implementation in which the code is executed by an image signal processor, the code may cause the capturing by activating various circuitry including one or more of image sensors, a power supply, a lens, an autofocusing (AF) system, an autoexposure (AE) system, a shutter, a flash, memory, an analog-to-digital converter (ADC), or an image front end (IFE).

In a thirtieth aspect, in combination with one or more of the twenty-first aspect through the twenty-ninth aspect, determining an alignment correction includes determining a first direction of global motion, and aligning the corrected first image frame to the corrected second image frame in a second direction opposite that of the first direction.

In one or more aspects, techniques for supporting frame alignment in a sequence of computationally-enhanced image frames forming a video may be implemented in or by a device, including a first image sensor configured with a first field of view, a processor coupled to the first image sensor, and a memory coupled to the processor. The processor is configured to perform steps including additional aspects, such as any single aspect or any combination of aspects described below or in connection with one or more other processes or devices described elsewhere herein. In a thirty-first aspect, supporting frame alignment in a sequence of computationally-enhanced image frames forming a video may include a device configured to receive a first image frame captured at a first exposure time and a second image frame captured at a second exposure time different from the first exposure time. The device is further configured to receive a first image frame captured using a first exposure time and a second image frame using a second exposure time different from the first exposure time; determine a corrected first image frame based on the first image frame, first motion data corresponding to the first image frame, and second motion data corresponding to the second image frame; determine a corrected second image frame based on the second image frame, the first motion data, and the second motion data; determine an alignment correction to align the corrected first image frame to the corrected second image frame; and/or determine a fused image frame based on the first image frame, the second image frame, and the alignment correction. Additionally, the device may perform or operate according to one or more aspects as described below. In some implementations, the device includes a wireless device, such as a base station (BS) or user equipment (UE). In some implementations, the device may include at least one processor, and a memory coupled to the processor, wherein the processor may be configured to perform operations described herein with respect to the device. In some other implementations, the device may include a non-transitory computer-readable medium having program code recorded thereon and the program code may be executable by the device for causing the device to perform operations described herein with reference to the device. In some implementations, the device may include one or more means configured to perform operations described herein.

In a thirty-second aspect, in combination with the thirty-first aspect, determining a corrected first image frame includes applying a first rolling shutter correction (RSC) to the first image frame. Determining a corrected second image frame includes applying a second rolling shutter correction (RSC) to the second image frame, the first rolling shutter correction (RSC) and the second rolling shutter correction (RSC) based on both the first motion data and the second motion data.

In a thirty-third aspect, in combination with one or more of the thirty-first aspect through the thirty-second aspect, the first motion data and the second motion data include gyroscope data.

In a thirty-fourth aspect, in combination with one or more of the thirty-first aspect through the thirty-third aspect, determining an alignment correction includes determining a first correction value based on the first motion data and the second motion data.

In a thirty-fifth aspect, in combination with the thirty-fourth aspect, determining an alignment correction includes determining matched features between the first image frame and the second image frame, and determining a second correction value based on a matched feature distance between the matched features. The alignment correction is based on determining matched features between the first image frame and the second image frame.

In a thirty-sixth aspect, in combination with the thirty-fifth aspect, determining an alignment correction further includes determining, when a first criteria is met, the alignment correction based on the first correction value, and determining, when a second criteria is met, the alignment correction based on the second correction value.

In a thirty-seventh aspect, in combination with one or more of the thirty-fifth aspect through the thirty-sixth aspect, determining an alignment correction further includes determining a feature point offset component associated with the matched feature distance, determining the alignment correction based on the first correction value when the feature point offset component is below a first threshold, and determining the alignment correction based on the second correction value when the feature point offset component is not below the first threshold.

In a thirty-eighth aspect, in combination with one or more of the thirty-fifth aspect through the thirty-seventh aspect, determining an alignment correction further includes determining whether a distance difference between foreground and background objects in the first image frame is below a first depth threshold, determining the alignment correction based on the first correction value when the distance difference is not below the first depth threshold, and determining the alignment correction based on the second correction value when the distance difference is below the first depth threshold.

In a thirty-ninth aspect, in combination with one or more of the thirty-first aspect through the thirty-eighth aspect, the processor is configured to perform further operations including capturing the first image frame at the first exposure time, and capturing the second image frame at the second exposure time after capturing the first image frame. The second exposure time is longer than the first exposure time.

In a fortieth aspect, in combination with one or more of the thirty-first aspect through the thirty-ninth aspect, determining an alignment correction includes determining a first direction of global motion, and aligning the corrected first image frame to the corrected second image frame in a second direction opposite that of the first direction.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIG. 1, FIG. 5A, FIG. 5B, FIG. 9, and FIG. 10 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
   receiving a first image frame obtained at a first time and a second image frame obtained at a second time later than the first time;
   determining a corrected first image frame based on the first image frame, first motion data corresponding to motion at the first time when obtaining the first image frame, and second motion data corresponding to motion at the second time when obtaining the second image frame;
   determining a corrected second image frame based on the second image frame, the first motion data, and the second motion data;
   determining an alignment correction to align the corrected first image frame to the corrected second image frame, wherein the alignment correction is based on the first motion data and the second motion data when a distance difference between foreground and background objects in the first image is not below a first depth threshold, and wherein the alignment correction is based on a matched feature distance between matched features between the first image frame and the second image frame when the distance difference between foreground and background objects in the first image is below the first depth threshold; and
   determining a fused image frame based on the first image frame, the second image frame, and the alignment correction.

2. The method of claim 1, wherein determining a corrected first image frame comprises applying a first rolling shutter correction (RSC) to the first image frame, and wherein determining a corrected second image frame comprises applying a second rolling shutter correction (RSC) to the second image frame, the first rolling shutter correction (RSC) and the second rolling shutter correction (RSC) based on both the first motion data and the second motion data.

3. The method of claim 1, wherein the first motion data and the second motion data comprise gyroscope data.

4. The method of claim 1, wherein determining an alignment correction comprises:
   determining the matched features between the first image frame and the second image frame.

5. The method of claim 1, wherein:
   the first image frame is captured using a first exposure time, and
   the second image frame is captured using a second exposure time, the second exposure time being longer than the first exposure time.

6. The method of claim 1, wherein determining an alignment correction comprises:
   determining a first direction of global motion; and
   aligning the corrected first image frame to the corrected second image frame in a second direction opposite that of the first direction.

7. A device, comprising:
   a processor; and
   a memory coupled to the processor and storing instructions that, when executed by the processor, cause the device to perform operations comprising:
   receiving a first image frame obtained at a first time and a second image frame obtained at a second time later than the first time;
   determining a corrected first image frame based on the first image frame, first motion data corresponding to motion at the first time when obtaining the first image frame, and second motion data corresponding to motion at the second time when obtaining the second image frame;
   determining a corrected second image frame based on the second image frame, the first motion data, and the second motion data;
   determining an alignment correction to align the corrected first image frame to the corrected second image frame, wherein the alignment correction is based on the first motion data and the second motion data when a distance difference between foreground and background objects in the first image is not below a first depth threshold, and wherein the alignment correction is based on a matched feature distance between matched features between the first image frame and the second image frame when the distance difference between foreground and background objects in the first image is below the first depth threshold; and
   determining a fused image frame based on the first image frame, the second image frame, and the alignment correction.

8. The device of claim 7, wherein determining a corrected first image frame comprises applying a first rolling shutter correction (RSC) to the first image frame, and wherein determining a corrected second image frame comprises applying a second rolling shutter correction (RSC) to the second image frame, the first rolling shutter correction (RSC) and the second rolling shutter correction (RSC) based on both the first motion data and the second motion data.

9. The device of claim 7, wherein the first motion data and the second motion data comprise gyroscope data.

10. The device of claim 7, wherein determining an alignment correction comprises:
    determining the matched features between the first image frame and the second image frame.

11. The device of claim 7, wherein:
the first image frame is captured using a first exposure time, and
the second image frame is captured using a second exposure time, the second exposure time being longer than the first exposure time.

12. The device of claim 7, wherein determining an alignment correction comprises:
determining a first direction of global motion; and
aligning the corrected first image frame to the corrected second image frame in a second direction opposite that of the first direction.

13. A non-transitory computer-readable medium storing instructions that, when executed by a processor of a device, cause the device to perform operations comprising:
receiving a first image frame obtained at a first time and a second image frame obtained at a second time later than the first time;
determining a corrected first image frame based on the first image frame, first motion data corresponding to motion at the first time when obtaining the first image frame, and second motion data corresponding to motion at the second time when obtaining the second image frame, wherein the alignment correction is based on the first motion data and the second motion data when a distance difference between foreground and background objects in the first image is not below a first depth threshold, and wherein the alignment correction is based on a matched feature distance between matched features between the first image frame and the second image frame when the distance difference between foreground and background objects in the first image is below the first depth threshold;
determining a corrected second image frame based on the second image frame, the first motion data, and the second motion data;
determining an alignment correction to align the corrected first image frame to the corrected second image frame; and
determining a fused image frame based on the first image frame, the second image frame, and the alignment correction.

14. The non-transitory computer-readable medium of claim 13, wherein determining a corrected first image frame comprises applying a first rolling shutter correction (RSC) to the first image frame, and wherein determining a corrected second image frame comprises applying a second rolling shutter correction (RSC) to the second image frame, the first rolling shutter correction (RSC) and the second rolling shutter correction (RSC) based on both the first motion data and the second motion data.

15. The non-transitory computer-readable medium of claim 13, wherein the first motion data and the second motion data comprise gyroscope data.

16. The non-transitory computer-readable medium of claim 13, wherein determining an alignment correction comprises:
determining the matched features between the first image frame and the second image frame.

17. The non-transitory computer-readable medium of claim 13, wherein:
the first image frame is captured using a first exposure time, and
the second image frame is captured using a second exposure time, the second exposure time being longer than the first exposure time.

18. The non-transitory computer-readable medium of claim 13, wherein determining an alignment correction comprises:
determining a first direction of global motion; and
aligning the corrected first image frame to the corrected second image frame in a second direction opposite that of the first direction.

19. A device, comprising:
a first image sensor;
a processor coupled to the first image sensor; and
a memory coupled to the processor,
wherein the processor is configured to perform steps comprising:
receiving a first image frame obtained at a first time and a second image frame obtained at a second time later than the first time;
determining a corrected first image frame based on the first image frame, first motion data corresponding to motion at the first time when obtaining the first image frame, and second motion data corresponding to motion at the second time when obtaining the second image frame;
determining a corrected second image frame based on the second image frame, the first motion data, and the second motion data;
determining an alignment correction to align the corrected first image frame to the corrected second image frame, wherein the alignment correction is based on the first motion data and the second motion data when a distance difference between foreground and background objects in the first image is not below a first depth threshold, and wherein the alignment correction is based on a matched feature distance between matched features between the first image frame and the second image frame when the distance difference between foreground and background objects in the first image is below the first depth threshold; and
determining a fused image frame based on the first image frame, the second image frame, and the alignment correction.

20. The device of claim 19, wherein determining a corrected first image frame comprises applying a first rolling shutter correction (RSC) to the first image frame, and wherein determining a corrected second image frame comprises applying a second rolling shutter correction (RSC) to the second image frame, the first rolling shutter correction (RSC) and the second rolling shutter correction (RSC) based on both the first motion data and the second motion data.

21. The device of claim 19, wherein the first motion data and the second motion data comprise gyroscope data.

22. The device of claim 19, wherein determining an alignment correction comprises:
determining the matched features between the first image frame and the second image frame.

23. The device of claim 19, wherein:
the first image frame is captured using a first exposure time, and
the second image frame is captured using a second exposure time, the second exposure time being longer than the first exposure time.

24. The device of claim 19, wherein determining an alignment correction comprises:
determining a first direction of global motion; and
aligning the corrected first image frame to the corrected second image frame in a second direction opposite that of the first direction.

* * * * *